(12) United States Patent
Fujita et al.

(10) Patent No.: US 8,263,264 B2
(45) Date of Patent: *Sep. 11, 2012

(54) NONAQUEOUS ELECTROLYTE BATTERY, BATTERY PACK AND VEHICLE

(75) Inventors: Yumi Fujita, Yokohama (JP); Hiroki Inagaki, Kawasaki (JP); Hidesato Saruwatari, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/897,896

(22) Filed: Oct. 5, 2010

(65) Prior Publication Data

US 2011/0033751 A1 Feb. 10, 2011

Related U.S. Application Data

(63) Continuation of application No. 11/687,844, filed on Mar. 19, 2007, now Pat. No. 7,833,664.

(30) Foreign Application Priority Data

Mar. 30, 2006 (JP) ................................ 2006-094355

(51) Int. Cl.
*H01M 4/13* (2010.01)
(52) U.S. Cl. ............... 429/231.95; 429/209; 429/231.5
(58) Field of Classification Search .................. 429/209, 429/247, 231.95, 231.5
See application file for complete search history.

(56) References Cited

U.S. PATENT DOCUMENTS

| | | | |
|---|---|---|---|
| 5,301,765 A * | 4/1994 | Swanson .................... | 180/68.5 |
| 5,888,671 A * | 3/1999 | Yamasaki et al. ............ | 429/232 |
| 6,124,059 A * | 9/2000 | Bohnstedt et al. ........... | 429/252 |
| 6,221,531 B1 * | 4/2001 | Vaughey et al. ........... | 429/231.1 |
| 6,489,062 B1 | 12/2002 | Watanabe et al. | |
| 6,740,446 B2 * | 5/2004 | Corrigan et al. ............ | 429/152 |
| 6,949,315 B1 | 9/2005 | Sami et al. | |
| 7,393,476 B2 | 7/2008 | Shiozaki et al. | |
| 7,462,425 B2 * | 12/2008 | Takami et al. .............. | 429/245 |
| 7,468,224 B2 | 12/2008 | Li et al. | |
| 7,521,151 B2 * | 4/2009 | Hwang et al. .............. | 429/209 |

(Continued)

FOREIGN PATENT DOCUMENTS

EP 0 811 479 A2 12/1997

(Continued)

OTHER PUBLICATIONS

Gogova, Journal of Power Sources, (2006), vol. 158, pp. 1054-1061, Investigation of the porous structure of battery separators using various porometric methods.

(Continued)

*Primary Examiner* — Ula C. Ruddock
*Assistant Examiner* — Thomas H. Parsons
(74) *Attorney, Agent, or Firm* — Oblon, Spivak, McClelland, Maier & Neustadt, L.L.P.

(57) ABSTRACT

A nonaqueous electrolyte battery includes a positive electrode, a negative electrode, a separator and a nonaqueous electrolyte. The negative electrode contains a negative electrode active material having a Lithium ion insertion potential of 0.4 V (vs. Li/Li$^+$) or more. The separator is provided between the positive electrode and the negative electrode. The separator has a porosity of 50% or more and a pore diameter distribution in which a median diameter is larger than a mode diameter. The porosity and the pore diameter distribution are measured by mercury porosimetry. A surface roughness of the negative electrode is larger than the mode diameter.

20 Claims, 10 Drawing Sheets

U.S. PATENT DOCUMENTS 7,583,058 B2    9/2009  Iijima et al.
2004/0234856 A1*  11/2004  Morigaki et al. .......... 429/231.1

FOREIGN PATENT DOCUMENTS

EP          1447866       *   8/2004
EP       1 705 736  A1        9/2006
JP         10-294135           11/1998

OTHER PUBLICATIONS

Djian et al, Journal of Power Sources, (2007), vol. 172, pp. 416-421, Lithium-ion batteries with high charge rate capacity: Influence of the porous separator.

* cited by examiner

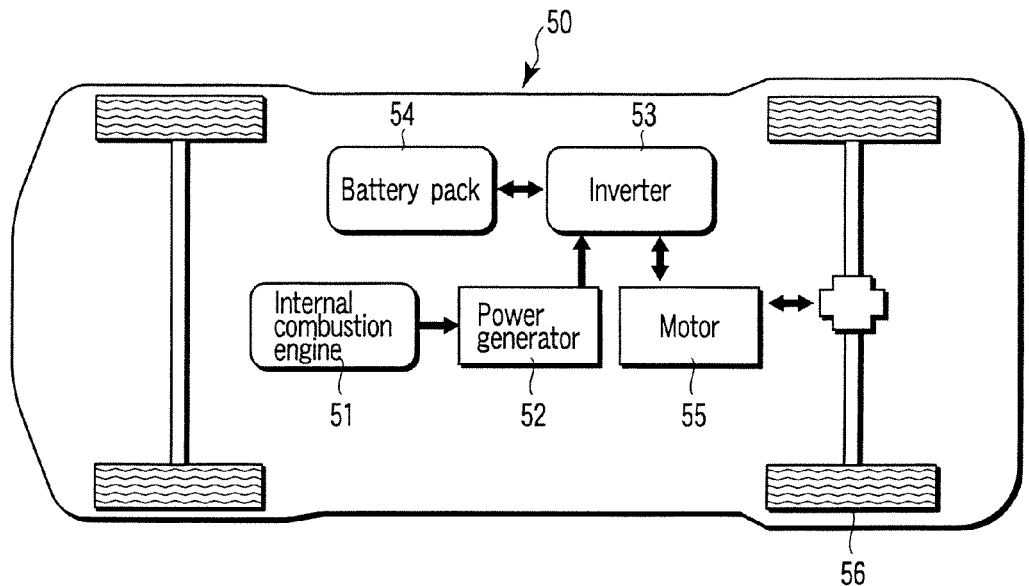
F I G. 11
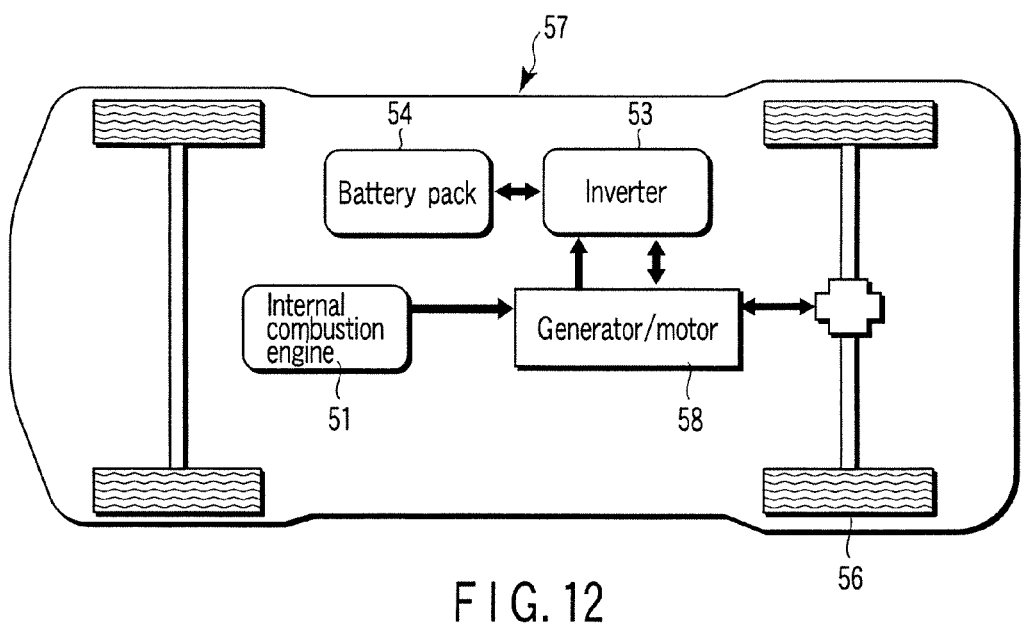
F I G. 12

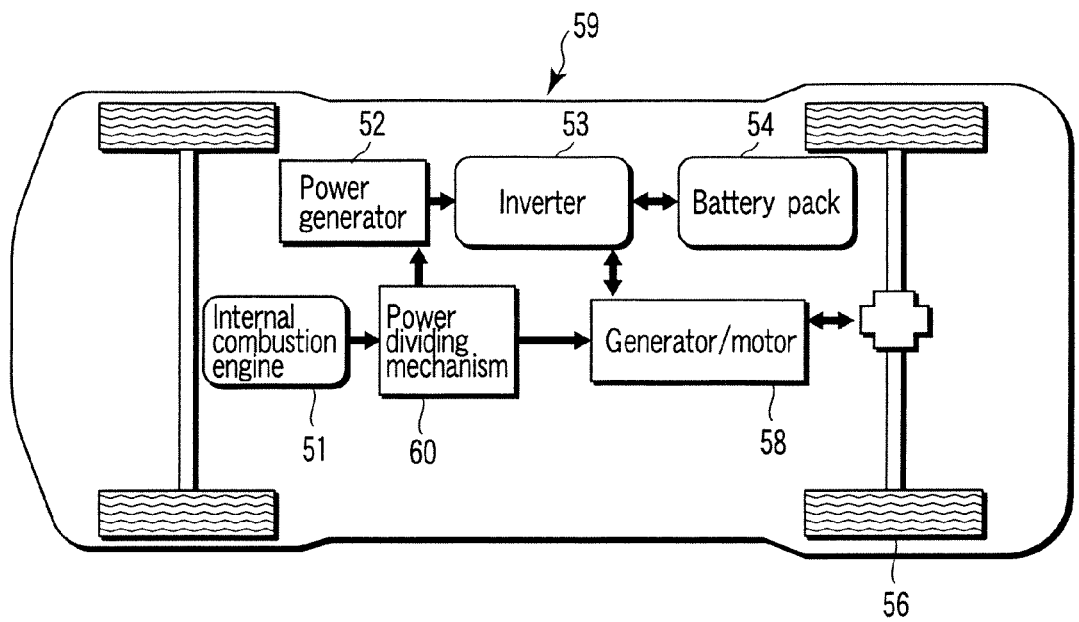
F I G. 13
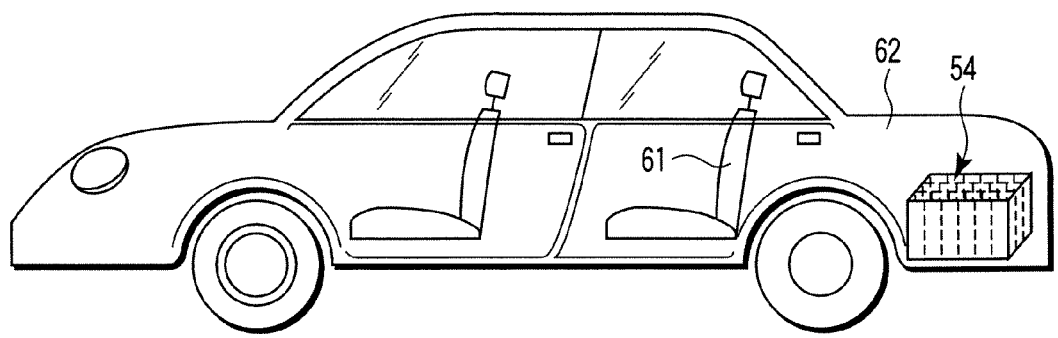
F I G. 14

NONAQUEOUS ELECTROLYTE BATTERY, BATTERY PACK AND VEHICLE

CROSS-REFERENCE TO RELATED APPLICATIONS

This application is based upon and claims the benefit of priority from prior Japanese Patent Application No. 2006-094355, filed Mar. 30, 2006, the entire contents of which are incorporated herein by reference.

BACKGROUND OF THE INVENTION

1. Field of the Invention

The present invention relates to a nonaqueous electrolyte battery, a battery pack using the nonaqueous electrolyte battery and a vehicle using the battery pack.

2. Description of the Related Art

Along with miniaturization of, for example, personal computers, video cameras and portable telephones, nonaqueous electrolyte batteries have been put to practical use and widely spread in the fields of information relevant devices and communication devices as the power sources because they have high energy density. Meanwhile, in the field of vehicles, it is desired to develop electric motor vehicles as quickly as possible because of environmental and resource problems and studies are being made also as to nonaqueous electrolyte batteries as the power sources of these electric motor vehicles. for the power source of these electric motor vehicles to have a high energy density and, specifically, to have a high discharge capacity per unit weight or unit volume. Then, even in the case where large current is input in a moment to recover the kinetic energy in the decelerating stage as the electric power, it is demanded of these secondary batteries to have the ability of charging efficiently. These batteries also need to have the ability to output large power, and specifically, to discharge large current in a moment, when the vehicles start, abruptly move or abruptly accelerate. In short, the secondary batteries used as the power sources of electric motor vehicles are desired not only to have a large capacity but also to have good performance of inputting and outputting power in a short time.

As the technologies used to improve the performance of inputting and outputting power of nonaqueous electrolyte batteries in a short time, technologies are known in which a nonaqueous electrolyte battery and an electric double layer capacitor are combined to constitute a hybrid element as described in JP-A 10-294135 (KOKAI). These technologies have the intention of increasing the time constant of the hybrid element by the capacitive component of the electric double layer capacitor to decrease a variation in voltage in a short time, thereby improving inputting and outputting performance in a short time at low temperature.

BRIEF SUMMARY OF THE INVENTION

According to a first aspect of the present invention, there is provided a nonaqueous electrolyte battery comprising:
a positive electrode;
a negative electrode containing a negative electrode active material having a Lithium ion insertion potential of 0.4 V (vs. Li/Li$^+$) or more;
a separator which is provided between the positive electrode and the negative electrode, and has a porosity of 50% or more and a pore diameter distribution in which a median diameter is larger than a mode diameter, the porosity and the pore diameter distribution being measured by mercury porosimetry, a surface roughness of the negative electrode being larger than the mode diameter; and
a nonaqueous electrolyte.

According to a second aspect of the present invention, there is provided a battery pack comprising a nonaqueous electrolyte battery, the nonaqueous electrolyte battery comprising:
a positive electrode;
a negative electrode containing a negative electrode active material having a Lithium ion insertion potential of 0.4 V (vs. Li/Li$^+$) or more;
a separator which is provided between the positive electrode and the negative electrode, and has a porosity of 50% or more and a pore diameter distribution in which a median diameter is larger than a mode diameter, the porosity and the pore diameter distribution being measured by mercury porosimetry, a surface roughness of the negative electrode being larger than the mode diameter; and
a nonaqueous electrolyte.

BRIEF DESCRIPTION OF THE SEVERAL VIEWS OF THE DRAWING

FIG. 11 is a typical view showing a series hybrid car according to a third embodiment;

FIG. 12 is a typical view showing a parallel hybrid car according to the third embodiment;

FIG. 13 is a typical view showing a series-parallel hybrid car according to the third embodiment;

FIG. 14 is a typical view showing a car according to the third embodiment;

DETAILED DESCRIPTION OF THE INVENTION

Figure 1:
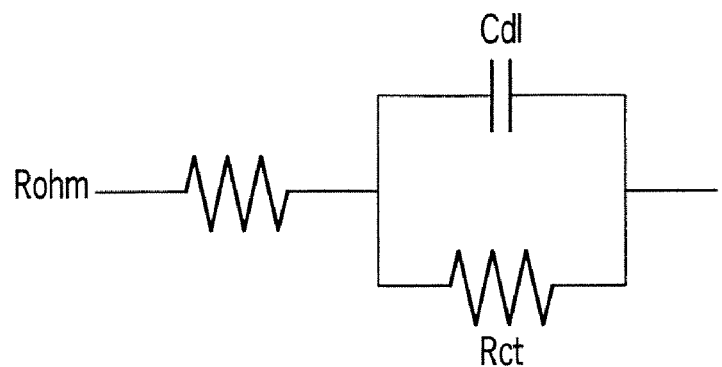
FIG. 1 is an equivalent circuit diagram for explaining electric characteristics of a nonaqueous electrolyte battery.

According to the technologies shown in the above JP-A 10-294135 (KOKAI), the short-time input and output performance are improved. These technologies, however, have the drawback that besides the nonaqueous electrolyte battery, an electric double layer capacitor is specially required, which complicates the structure of the element and also, increases the cost of the element.

The inventors of the present invention have made earnest studies and repeated experiments and, as a result, found that the input and output performance of the nonaqueous electrolyte battery under a large current are improved by increasing an electric double layer capacity which the nonaqueous electrolyte battery has without combining the electric double layer capacitor with the nonaqueous electrolyte battery.

The electric properties of the nonaqueous electrolyte battery will be explained using an equivalent circuit shown in FIG. 1. In this equivalent circuit, an ohm resistance R ohm is connected in series with a parallel circuit consisting of an electric double layer capacity Cdl and an reaction resistance Rct. When a current I is allowed to flow, a variation in voltage with time is expressed by the sum of a voltage variation $\Delta V_0$ (=R ohm×I) and a voltage variation $\Delta V_1$. The voltage variation $\Delta V_0$ is originated in an ohm resistance R ohm which arises almost simultaneously when current is flowed. The voltage variation $\Delta V_1$ is dependent on the time determined by the magnitude of the time constant $\tau$ given by the product of the electric double layer capacity Cdl and the reaction resistance Rct. It should be noted that although in the nonaqueous electrolyte battery, a variation in voltage originated from the type of the active material of the positive or negative electrode or a variation in the concentration of the nonaqueous electrolyte arises, it has a small influence on the power input and output in a time as small as about several seconds and therefore the description will be given here excluding this variation in voltage.

When the ohm resistance R ohm component and the reaction resistance Rct component which the nonaqueous electrolyte battery has are large, a variation in the voltage of the battery is increased when the same current is flowed. The ohm resistance R ohm and the reaction resistance Rct are larger at low temperature where the battery reaction is deactivated than at high temperature. This increases a variation in the voltage of the battery, bringing about a reduction in the short-time input and output performance. Particularly, the nonaqueous electrolyte battery is more significantly reduced in its input and output performance than batteries using an aqueous type electrolytic solution.

The time constant $\tau$ given by the product of the electric double layer capacity Cdl and the reaction resistance Rct is increased by increasing the electric double layer capacity Cdl shown in the above equivalent circuit. Then, the increase in the time constant $\tau$ causes a time delay of the variation in voltage originated from the reaction resistance Rct. Therefore, the variation in voltage in a short time as small as several seconds from the start of charging and discharging is decreased, with the result that the input and output performance under a large current and, particularly, the input and output performance under a large current at low temperature are improved.

The present invention is based on the findings that the electric double layer capacity of the nonaqueous electrolyte battery is increased by using a negative electrode containing a negative electrode active material having a Lithium ion insertion potential of 0.4 V (vs. Li/Li$^+$) or more and a separator having the porosity of 50% or more and the pore diameter distribution in which the median diameter is larger than the mode diameter, and the surface roughness of the negative electrode is larger than the mode diameter. The porosity and the pore diameter distribution are measured by the mercury porosimetry.

The nonaqueous electrolyte retaining ability of the separator can be improved by setting the porosity of the separator to 50% or more and also, by allowing the median diameter to be larger than the mode diameter. Also, the density (number) of the pores of the separator facing the surface of the negative electrode can be increased by allowing the surface roughness of the negative electrode to be larger than the mode diameter, thereby increasing the diffusibility of the nonaqueous electrolyte. As a result, the wet area of the separator and the reaction area of the negative electrode are increased and therefore, a large electric double layer capacity is obtained.

Figure 2:
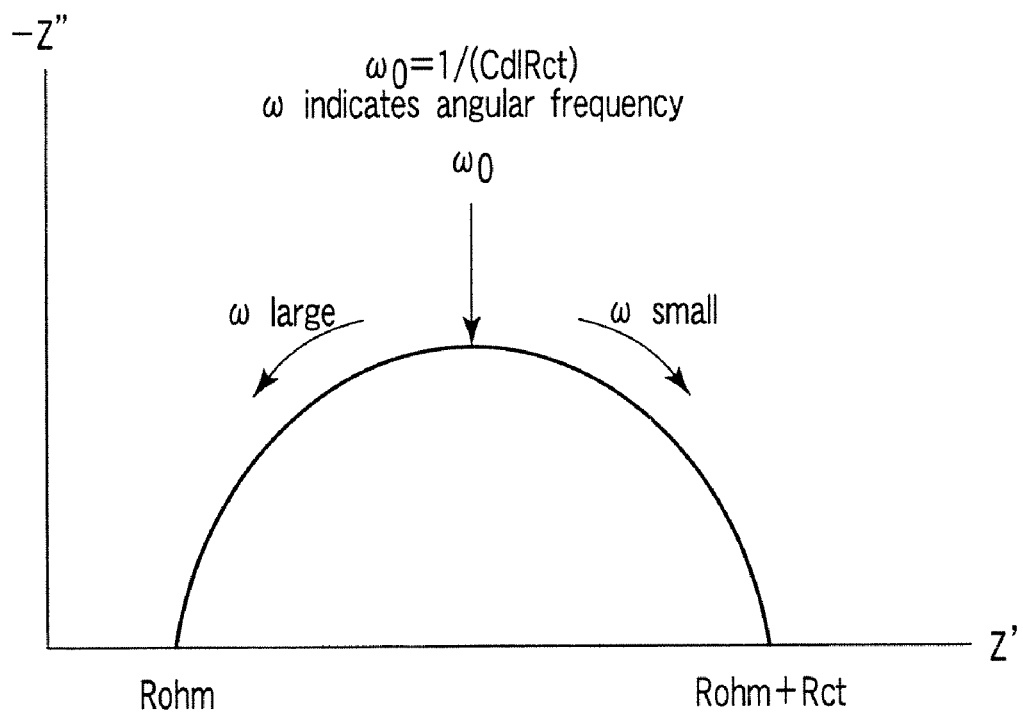
FIG. 2 is a curve showing a Cole-Cole plot obtained by indicating an impedance measured by an AC impedance method, on a composite plane.

Here, as the electric double layer capacity of the nonaqueous electrolyte battery, a value measured by the AC impedance method which is generally used to evaluate batteries is adopted. In this measuring method, an impedance measuring system comprising a potentiostat and a frequency response analyzer is used and a subtle voltage amplitude is given to a nonaqueous electrolyte battery which is a subjected to be measured, to analyze the response current. The nonaqueous electrolyte battery to be subjected to the measurement is one which is initially charged to a state of charge (SOC) of 100% at an ambient temperature of 45° C. As regards the measuring condition, voltage having a voltage amplitude of 5 mV and a frequency range from 100 kHz to 50 mHz is applied at an ambient temperature of 25° C. Then, the measured impedance is indicated on a composite plane to thereby obtain a Cole-Cole plot as shown in FIG. 2. There is the case where a circular arc which appears on the Cole-Cole plot is obtained plurally, and therefore, a circular arc which appears in the lowest frequency region is used to calculate the electric double layer capacity from the angular frequency ω0 of the peak of the circular arc and a reaction resistance Rct given by the radius of the circular arc according to the following equation: 1/(ω0×Rct). As the electric double layer capacity of the nonaqueous electrolyte battery, the value obtained in this manner is used.

Each embodiment of the present invention will be hereinafter explained with reference to the drawings. Structures common throughout these embodiments are represented by the same symbols and duplicated explanations are omitted. Also, each view is a typical view for explaining the invention and accelerating the understanding of the invention. Though there are parts having a shape, dimension, ratio and the like different from those of an actual device, designs of these parts may be properly modified in consideration of the following explanations and known technologies.

(First Embodiment)

An example of the nonaqueous electrolyte battery according to a first embodiment will be explained in detail with reference to FIGS. 3 to 5.

Figure 3:
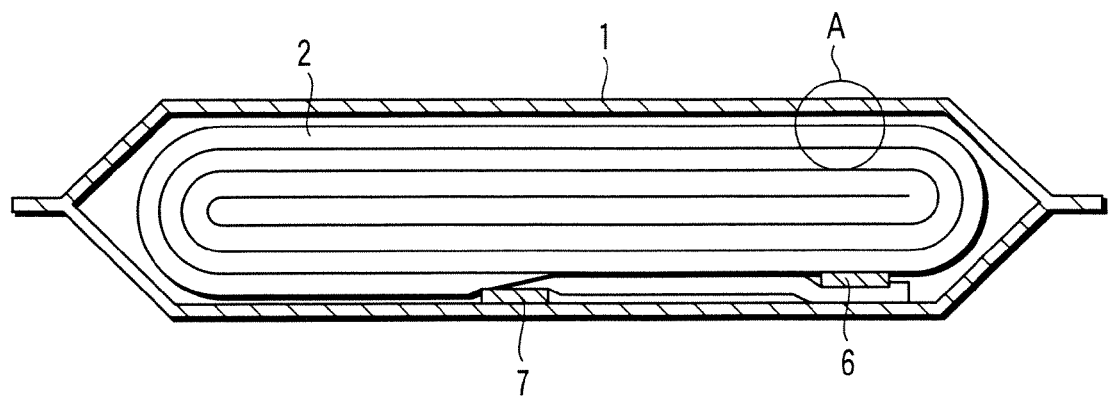
FIG. 3 is a typical sectional view of a flat type nonaqueous electrolyte battery according to a first embodiment.

As shown in FIG. 3, an electrode group 2 is stored in a case 1 made of a film. The electrode group 2 has a structure in which a positive electrode 3 and a negative electrode 4 are coiled flat-wise through a separator 5. As shown in FIG. 4, the positive electrode 3 includes a positive electrode current collector 3a and a positive electrode active material-containing layer 3b formed on at least one surface of the positive electrode current collector 3a. Also, the negative electrode 4 includes a negative electrode current collector 4a and a negative electrode active material-containing layer 4b formed on at least one surface of the negative electrode current collector 4a. The separator 5 is interposed between the positive electrode active material-containing layer 3b and the negative electrode active material-containing layer 4b.

Figure 5:
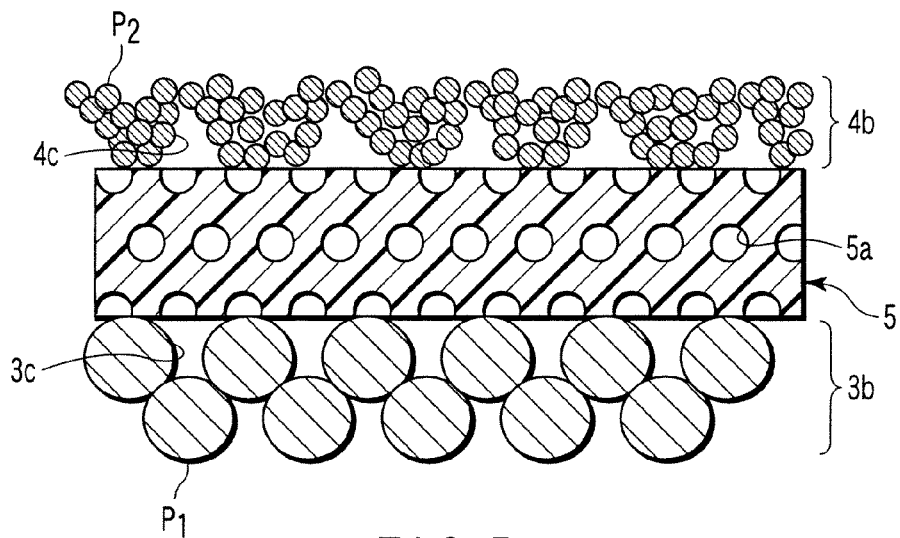
FIG. 5 is a typical view showing the vicinities of the boundaries between a positive electrode, a separator and a negative electrode in the nonaqueous electrolyte battery of FIG. 3.

As shown in FIG. 5, the positive electrode active material-containing layer 3b, the negative electrode active material-containing layer 4b and the separator 5 are all porous. The nonaqueous electrolyte is retained in a pore 3c positioned between positive electrode active material particles $P_1$ in the positive electrode active material-containing layer 3b, a pore 4c positioned between negative electrode active material particles $P_2$ in the negative electrode active material-containing layer 4b and a pore 5a of the separator 5. The separator 5 keeping the nonaqueous electrolyte in the pore 5a functions as an electrolytic plate. An adhesive polymer may be retained together with the nonaqueous electrolyte in these pores 3c, 4c and 5a.

A band-like positive electrode terminal 6 is connected to the positive electrode current collector 3a of the electrode group 2 and the end of the terminal is drawn out of the case 1. Also, a band-like negative electrode terminal 7 is connected to the negative electrode current collector 4a of the electrode group 2 and the end of the terminal is drawn out of the case 1. The positive electrode terminal 6 and the negative electrode terminal 7 are drawn out of the same side of the case 1 and are therefore drawn out in the same direction.

The following structure may be adopted: the negative electrode current collector 4a is positioned on the outermost layer of the electrode group 2 and at least a part of the surface of this outermost layer may be coated with an adhesive portion. The electrode group 2 can be thereby stuck to the case 1.

The positive electrode, the negative electrode, the separator, the nonaqueous electrolyte and the case will be explained.

1) Negative Electrode

This negative electrode includes the negative electrode current collector and the negative electrode active material-containing layer which is carried on one or both surfaces of the negative electrode current collector and contains a negative electrode active material having a Lithium ion insertion potential of 0.4 V (vs. Li/Li$^+$) or more.

The reason why the lithium ion insertion potential of the negative electrode active material is defined in the above range will be explained. If active materials (for example, graphite and a lithium metal) which absorb lithium at a potential less than 0.4 V (vs. Li/Li$^+$) are used, metal lithium is precipitated on the surface of a negative electrode and is grown to a lithium dendrite when input and output operations are repeated under a large current. Because pores having a large diameter exist in the separator having a porosity of 50% or more and a median diameter larger than a mode diameter, the lithium dendrite easily penetrates through the separator. Therefore, if active materials having a Lithium ion insertion potential less than 0.4 V (vs. Li/Li$^+$) are used, internal short circuits occur when the power input and output are carried out under a large current.

The use of a negative electrode active material having a lithium ion insertion potential of 0.4 V (vs. Li/Li$^+$) or nobler than 0.4 V (vs. Li/Li$^+$) ensures that even if pores having a large diameter exist in the separator, the precipitation of metal lithium on the surface of the negative electrode can be suppressed and it is therefore possible to avoid the internal short circuits when the power input and output are carried out under a large current. Therefore, the lithium ion insertion potential of the negative electrode active material is preferably 0.4 V (vs. Li/Li$^+$) or more. The upper limit of the lithium ion insertion potential is preferably 3 V (vs. Li/Li$^+$) and more preferably 2 V (vs. Li/Li$^+$).

The negative electrode active material capable of inserting lithium ion in the range of 0.4 to 3 V (vs. Li/Li$^+$) is preferably metal oxides, metal sulfides, metal nitrides or alloys.

Examples of such metal oxides include titanium-containing metal composite oxides, for example, tin type oxides such as $SnB_{0.4}P_{0.6}O_{3.1}$ and $SnSiO_3$, silicon type oxides such as SiO and tungsten type oxides such as $WO_3$. Among these materials, titanium-containing metal composite oxides are preferable.

Examples of the titanium-containing metal composite oxide may include titanium-based oxides containing no lithium when each oxide is synthesized, lithium-titanium oxide and lithium-titanium composite oxides obtained by substituting a part of the structural elements of lithium-titanium oxides with foreign elements. Examples of the lithium-titanium oxide may include lithium titanate having a spinel structure (for example, $Li_{4+x}Ti_5O_{12}$ (x is a value which is varied by charging or discharging, $0 \leq x \leq 3$)) and ramsdellite type lithium titanate (for example, $Li_{2+y}Ti_3O_7$ (y is a value which is varied by charging or discharging, $0 \leq y \leq 3$)).

The titanium-based oxide noted above includes, for example, $TiO_2$ and a metal composite oxide containing Ti and at least one element selected from the group consisting of P, V, Sn, Cu, Ni, Co and Fe. It is desirable for $TiO_2$ to be of anatase type and to have a low crystallinity caused by a heat treating temperature of 300 to 500° C. The metal composite oxide containing Ti and at least one element selected from the group consisting of P, V, Sn, Cu, Ni, Co and Fe includes, for example, $TiO_2$—$P_2O_5$, $TiO_2$—$V_2O_5$, $TiO_2$—$P_2O_5$—$SnO_2$, and $TiO_2$—$P_2O_5$-MeO (Me denoting at least one element selected from the group consisting of Cu, Ni, Co and Fe). To be more specific, it is desirable for the micro structure of the metal composite oxide to include a crystal phase and an amorphous phase or a single phase formed of an amorphous phase. The particular micro structure makes it possible to improve markedly the charge-discharge cycle performance of the nonaqueous electrolyte battery. Particularly, it is desirable to use lithium-titanium oxide and a metal composite oxide containing Ti and at least one element selected from the group consisting of P, V, Sn, Cu, Ni, Co and Fe.

The metal sulfides include, for example, titanium-based sulfide (for example, $TiS_2$), molybdenum-based sulfide (for example, $MoS_2$), and iron-based sulfides (for example, FeS, $FeS_2$, $Li_xFeS_2$ ($0 \leq x \leq 4$)).

Examples of metal nitrides include lithium-based nitrides (for example, $(Li, Me)_3N$ {where Me represents a transition metal element}).

The average particle diameter of the negative electrode active material is designed to be preferably 1 µm or less. Also, the specific surface area of the negative electrode active material according to the BET method using $N_2$ adsorption is preferably 1 to 10 m$^2$/g. If the average particle diameter is larger than 1 µm or the specific surface area is less than 1 m$^2$/g, the effective area contributing to the electrode reaction is small and there is therefore a possibility that the large-current discharge performance will deteriorate. Also, if the specific surface area exceeds 10 m$^2$/g, the amount of the reaction between the negative electrode and the nonaqueous electrolyte is increased and therefore, there is a possibility of reduction in charging and discharging efficiency and generation of gas when the battery is stored. It should be noted that, if the average particle diameter is too small, the distribution of the nonaqueous electrolyte is inclined to the negative electrode, giving rise to the possibility of a lack of the electrolyte on the positive electrode and therefore, the lower limit of the average particle diameter is preferably designed to be 0.001 µm.

The surface roughness Ra(–) of the negative electrode is larger than the mode diameter of the pore diameter distribution of the separator which is measured by the mercury porosimetry. If the surface roughness Ra(–) of the negative electrode is smaller than the mode diameter, the diffusibility of the nonaqueous electrolyte is reduced. Therefore, the electric double layer capacity at the boundary between the separator and the negative electrode is dropped and the input and output performance under a large current is not improved. Also, the surface roughness Ra(−) of the negative electrode is designed to be preferably 0.1 µm or more and 0.6 µm or less. This makes it possible to secure a sufficient wet area with the nonaqueous electrolyte while limiting a side reaction caused by the nonaqueous electrolyte and it is therefore possible to improve cycle performance besides the input and output performance. A more preferable range of the surface roughness Ra(−) of the negative electrode is 0.15 to 0.40

The ratio of the surface roughness Ra(−) of the negative electrode to the mode diameter is preferably designed to be two or less. This reduces the resistance at the boundary between the negative electrode and the separator and thus the input and output performance under a large current can be further improved. At the same time, the diffusion of the non-aqueous electrolyte due to capillary action can be promoted and at the same time, deterioration in cyclic performance due to the lack of the nonaqueous electrolyte can be limited.

The surface roughness Ra(−) of the negative electrode is preferably made to be larger than the mode diameter and median diameter of the pore diameter distribution of the separator measured by the mercury porosimetry. The separator satisfying such requirements has higher uniformity of the size of pores, making it possible to increase the number of pores facing the surface of the negative electrode and it is therefore possible to further improve the input and output performance under a large current.

The density of the negative electrode is preferably 2 g/cc or more. This is because if the density of the negative electrode is less than 2 g/cc, there is a possibility that a negative electrode having a surface roughness Ra(−) of 0.1 µm or more and 0.6 µm or less is not obtained. Moreover, when a negative electrode active material having an average particle diameter of 1 µm or less is used, a negative electrode having a surface roughness Ra(−) of 0.1 µm or more and 0.6 µm or less can be obtained in a simpler method. A more preferable range of the density of the negative electrode is from 2 to 2.5 g/cc.

The negative electrode is manufactured by suspending an electroconductive agent, a binder and the negative electrode active material in an appropriate solvent and by applying this suspension to a current collector such as an aluminum foil, followed by drying and pressing to form a band electrode.

As the above electroconductive agent, carbonaceous materials such as cokes are used. The average particle diameter of the carbonaceous material is preferably 0.1 µm or more to effectively suppress the generation of gas and 10 µm or less to construct a good electroconductive network. Similarly, the specific surface area of the carbonaceous material is preferably 10 m²/g or more to construct a good electroconductive network and 100 m²/g or less to effectively suppress the generation of gas.

As the above binder, polyvinylidene fluoride (PVdF) having an average molecular weight of $4 \times 10^5$ or more and $20 \times 10^5$ or less may be used. When PVdF having an average molecular weight falling in this range is used, the peeling strength between the negative electrode current collector and the negative electrode active material-containing layer can be increased to 0.005 N/mm or more, whereby the performance of the battery under a large current is improved. When the average molecular weight exceeds $20 \times 10^5$, sufficient peeling strength is obtained, but the viscosity of the coating solution is too high and it is therefore impossible to carrying out coating properly. A more preferable molecular weight is $5 \times 10^5$ or more and $10 \times 10^5$ or less.

The ratio of the above negative electrode active material, electroconductive agent and binder to be formulated is preferably as follows: the negative electrode active material: 67 to 97.5% by weight, the electroconductive agent: 2 to 28% by weight and the binder: 0.5 to 5% by weight. If the amount of the electroconductive agent is designed to be 2% by weight or more, high current collecting performance is obtained and an excellent performance under a large current is therefore obtained. On the other hand, the amount of the electroconductive agent is preferably 28% by weight or less from the viewpoint of obtaining a high capacity. Also, when the amount of the binder is designed to be 0.5% by weight or more, the peeling strength is made to be 0.005 N/mm or more. When the amount of the binder is designed to be 5% by weight or less, on the other hand, a proper coating viscosity is obtained, enabling good coating.

It is desirable for the current collector of the negative electrode to be formed of aluminum foil or aluminum alloy foil. It is also desirable for the negative electrode current collector to have an average crystal grain size not larger than 50 µm. In this case, the mechanical strength of the current collector can be drastically increased so as to make it possible to increase the density of the negative electrode by applying the pressing under a high pressure to the negative electrode. As a result, the battery capacity can be increased. Also, since it is possible to prevent the dissolution and corrosion deterioration of the negative electrode current collector in an overdischarge cycle under an environment of a high temperature not lower than, for example, 40° C., it is possible to suppress the elevation in the impedance of the negative electrode. Further, it is possible to improve the high-rate performance, the rapid charging performance, and the charge-discharge cycle performance of the battery. It is more desirable for the average crystal grain size of the negative electrode current collector to be not larger than 30 µm, furthermore desirably, not larger than 5 µm.

The average crystal grain size can be obtained as follows. Specifically, the texture of the current collector surface is observed with an electron microscope so as to obtain the number n of crystal grains present within an area of 1 mm×1 mm. Then, the average crystal grain area S is obtained from the formula "$S = 1 \times 10^6/n$ (µm²)", where n denotes the number of crystal grains noted above. Further, the average crystal grain size d (µm) is calculated from the area S by formula (1) given below:

$$d = 2(S/\pi)^{1/2} \quad (1)$$

The aluminum foil or the aluminum alloy foil having the average crystal grain size not larger than 50 µm can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 µm, more desirably not larger than 15 µm. Also, it is desirable for the aluminum foil to have a purity not lower than 99%. It is desirable for the aluminum alloy to contain another element such as magnesium, zinc or silicon. On the other hand, it is desirable for the amount of the transition metal such as iron, copper, nickel and chromium contained in the aluminum alloy to be not larger than 1%.

2) Positive Electrode

This positive electrode comprises a positive electrode current collector and a positive electrode active material-containing layer which is carried on one or both surfaces of the above positive electrode current collector and contains an active material and a binder.

Given as examples of the active materials of the above positive electrode are various oxides, sulfides and polymers. Examples of the active materials include manganese dioxide ($MnO_2$), iron oxide, copper oxide, nickel oxide, lithium-manganese composite oxide (for example, $Li_xMn_2O_4$ or $Li_xMnO_2$), lithium-nickel composite oxide (for example, $Li_xNiO_2$), lithium-cobalt composite oxide (for example, $Li_xCoO_2$), lithium-nickel-cobalt composite oxide (for example, $Li_xNi_{1-y}Co_yO_2$), lithium-manganese-cobalt composite oxide (for example, $Li_xMn_yCO_{1-y}O_2$), spinel type lithium-manganese-nickel composite oxide (for example, $Li_xMn_{2-y}Ni_yO_4$), lithium phosphates having an olivine structure (for example, $Li_xFePO_4$, $Li_xFe_{1-y}Mn_yPO_4$ and $Li_xCoPO_4$), iron sulfate ($Fe_2(SO_4)_3$) and vanadium oxide (for example, $V_2O_5$). Also, organic materials, for example, electroconductive polymers such as polyaniline and polypyrrole, and disulfide type polymers are exemplified. Inorganic materials, for example, sulfur (S) and carbon fluoride are exemplified.

Preferable examples of the positive electrode active materials for the secondary battery include lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($Li_xNi_{1-y}Co_yO_2$), spinel type lithium-manganese-nickel composite oxide ($Li_xMn_{2-y}Ni_yO_4$), lithium-manganese-cobalt composite oxide ($Li_xMn_yCO_{1-y}O_2$) and lithium iron phosphates ($Li_xFePO_4$). It is to be noted x and y are respectively preferably in the range of 0 to 1. These positive electrode active materials permit increasing the battery voltage.

Also, as the positive electrode active material, a lithium-nickel-cobalt-manganese composite oxide having a composition represented by the formula $Li_aNi_bCo_cMn_dO_2$ (where the molar ratios a, b, c, and d are given by the following equations: $0 \leq a \leq 1.1$, $0.1 \leq b \leq 0.5$, $0 \leq c \leq 0.9$, $0.1 \leq d \leq 0.5$) may be used.

When a nonaqueous electrolyte containing an ionic liquid is used, it is preferable to use lithium-iron phosphate, $Li_xVPO_4F$, lithium-manganese composite oxide, lithium-nickel composite oxide or lithium-nickel-cobalt composite oxide from the viewpoint of a cycle life. This is because reactivity between the above positive electrode active material and the ionic liquid is decreased.

The positive electrode is manufactured by suspending, for example, a positive electrode active material, a positive electrode electroconductive agent and a binder in a proper solvent, by applying the slurry manufactured by suspending to the positive electrode current collector, followed by drying to form a positive electrode active material-containing layer and then by subjecting the positive electrode active material-containing layer to a press. Other than the above, the positive electrode active material, the positive electrode electroconductive agent and the binder may be formed into a pellet, which is then used as the positive electrode active material-containing layer.

Examples of the above electroconductive agent may include acetylene black, carbon black and graphite.

Examples of the above binder include polytetrafluoroethylene (PTFE), polyvinylidene fluoride (PVdF) and fluorine-based rubber.

The ratio of the above positive electrode active material, electroconductive agent and binder to be formulated is preferably as follows: the positive electrode active material: 80 to 95% by weight, the electroconductive agent: 3 to 18% by weight and the binder: 2 to 17% by weight.

It is desirable for the positive electrode current collector to be formed of an aluminum foil or an aluminum alloy foil. It is desirable for the aluminum foil or the aluminum alloy foil forming the positive electrode current collector to have an average crystal grain size not larger than 50 μm. It is more desirable for the average crystal grain size noted above to be not larger than 30 μm, and furthermore desirably not larger than 5 μm. Where the average crystal grain size of the aluminum foil or the aluminum alloy foil forming the positive electrode current collector is not larger than 50 μm, the mechanical strength of the aluminum foil or the aluminum alloy foil can be drastically increased to make it possible to press the positive electrode with a high pressure. It follows that the density of the positive electrode can be increased to increase the battery capacity.

The aluminum foil or the aluminum alloy foil having the average crystal grain size not larger than 50 μm can be affected in a complicated fashion by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, preferably not larger than 15 μm. Also, it is desirable for the aluminum foil to have a purity not lower than 99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 1%.

The surface roughness Ra(+) of the positive electrode is preferably made to be larger than the mode diameter of the pore diameter distribution of the separator measured by the mercury porosimetry. This increases the number of pores of the separator facing the surface of the positive electrode and it is therefore possible to increase the wet area with the nonaqueous electrolyte. It is therefore possible to increase the electric double layer capacity at the boundary between the separator and the positive electrode. As a result, the time constant is increased, which further improves the input and output performance under a large current.

The surface roughness Ra(+) of the positive electrode is preferably 0.1 μm or more and 0.6 μm or less. This makes it possible to secure a sufficient wet area with the nonaqueous electrolyte while limiting a side reaction caused by the nonaqueous electrolyte and it is therefore possible to improve not only the input and output performance but also cycle performance. A more preferable range of the surface roughness Ra(+) of the positive electrode is 0.15 to 0.40 μm.

The surface roughness Ra(+) of the positive electrode is preferably made to be larger than the mode diameter and median diameter of the pore diameter distribution of the separator measured by the mercury porosimetry. The separator satisfying such requirements has higher uniformity of the size of pores, making it possible to increase the number of pores facing the surface of the positive electrode and it is therefore possible to further improve the input and output performance under a large current.

The ratio of the surface roughness Ra(+) of the positive electrode to the mode diameter is preferably designed to be two or less. This reduces the resistance at the boundary between the positive electrode and the separator, and the input and output performance under a large current can therefore be further improved. Also, the diffusion of the nonaqueous electrolyte due to capillary action can be promoted, with the result that deterioration in cyclic performance due to the lack of the nonaqueous electrolyte can be limited.

The density of the positive electrode is preferably 3 g/cc or more. This is because if the density of the positive electrode is less than 3 g/cc, there is a possibility that a positive electrode having a surface roughness Ra(+) of 0.1 μm or more and 0.6 μm or less is not obtained.

As the surface roughness Ra(−) of the negative electrode and the surface roughness Ra(+) of the positive electrode, the arithmetic mean roughness Ra prescribed in JIS B 0601 (1994) or JIS B 0031 (1994) is used.

3) Separator

As the separator, a porous separator is used.

Examples of the material of the porous separator include porous films containing polyethylene, polypropylene, cellulose or polyvinylidene fluoride (PVdF) and synthetic resin nonwoven fabrics. Among these materials, porous films made of polyethylene, polypropylene or both are preferable because the safety of the secondary battery can be improved.

The porosity of the separator measured by the mercury porosimetry is preferably 50% or more. The porosity of the separator is preferably 50% or more from the viewpoint of improving the retaining ability of the nonaqueous electrolyte and improving the input and output density. The porosity is preferably 70% or less from the viewpoint of keeping the safety of the battery. The porosity is more preferably in the range of 50 to 65%.

The median diameter and the mode diameter may be calculated from the pore diameter distribution measured by the mercury porosimetry. Here, the mode diameter indicates the peak top on a pore diameter distribution curve in which the abscissa is the pore diameter and the ordinate is the frequency. Also, the median diameter is a pore diameter when the cumulative volume frequency is 50%.

The median diameter is made to be larger than the mode diameter in the pore diameter distribution measured by the mercury porosimetry. Because in such a separator, there are many pores having a large size, the resistance of the separator can be dropped.

The separator is further increased in resistance as it is exposed to high temperature for a longer period or as it is exposed to high potential or oxidizing atmosphere. Specifically, the resistance of the separator is increased by the denaturing of the separator itself, the accumulation of reaction products associated with side reactions generated on the surface of the electrode, and the clogging of the separator by the accumulation of reaction products. As a result, the performance of the battery deteriorates. At this time, if the potential of the negative electrode is low, a part of the decomposed products generated on the boundary between the positive electrode and the nonaqueous electrolyte tend to be deposited on the surface of the negative electrode.

Since the negative electrode containing a negative electrode material having a Lithium ion insertion potential of 0.4 V (vs. Li/Li$^+$) or more has a high potential, the decomposed products are scarcely precipitated on the negative electrode. It is therefore possible that pores which are in contact with the negative electrode of the separator are prevented from being clogged and it is also possible to prevent pores from being clogged by the denaturing of the separator itself. This ensures that a reduction in the performance under a large current can be outstandingly limited even if the battery is exposed to high temperature in a charged state for a long period.

The separator preferably has the characteristics that the mode diameter of the pore diameter distribution measured by the mercury porosimetry is 0.05 μm or more and 0.4 μm or less. When the mode diameter is less than 0.05 μm, the film resistance of the separator is increased and also, the separator is denatured at high temperature and high voltage and the pores are crushed, giving rise to the possibility of reduced output. Also, when the mode diameter is larger than 0.4 μm, the shutdowns of the separators take place non-uniformly, giving rise to the possibility of low safety. A more preferable range is 0.10 μm or more and 0.35 μm or less.

The separator preferably has the characteristics that the median diameter of the pore diameter distribution measured by the mercury porosimetry is 0.1 μm or more and 0.5 μm or less. When the median diameter is less than 0.1 μm, the film resistance of the separator is increased and also, the separator is denatured at high temperature and high voltage and the pores are crushed, giving rise to the possibility of reduced output. Also, when the median diameter is larger than 0.5 μm, the shutdowns of the separators take place non-uniformly, bringing about low safety. The diffusion of the electrolyte due to capillary action is scarcely promoted and at the same time, deterioration in cyclic performance due to the lack of the electrolyte is induced. A more preferable range is 0.12 μm or more and 0.40 μm or less.

4) Nonaqueous Electrolyte

As this nonaqueous electrolyte, a liquid nonaqueous electrolyte may be used.

The liquid nonaqueous electrolyte is prepared by dissolving an electrolyte in an organic solvent.

Examples of the electrolyte include lithium salts such as lithium perchlorate (LiClO$_4$), lithium hexafluorophosphate (LiPF$_6$), lithium tetrafluoroborate (LiBF$_4$), lithium hexafluoroarsenate (LiAsF$_6$), lithium trifluoromethansulfonate (LiCF$_3$SO$_3$), and bistrifluoromethylsulfonylimide lithium [LiN(CF$_3$SO$_2$)$_2$].

The above electrolyte is preferably dissolved in an amount ranging from 0.5 to 2.5 mol/L based on the organic solvent.

Examples of the above organic solvent may include cyclic carbonates such as ethylene carbonate (EC), propylene carbonate (PC) and vinylene carbonate (VC), chain carbonates such as dimethyl carbonate (DMC), methylethyl carbonate (MEC) and diethyl carbonate (DEC), cyclic ethers such as tetrahydrofuran (THF) and 2-methyltetrahydrofuran (2MeTHF), chain ethers such as dimethoxyethane (DME), γ-butyrolactone (BL), acetonitrile (AN) and sulfolane (SL). These organic solvents may be used either singly or in combinations of two or more.

Also, as the liquid nonaqueous electrolyte, a ionic liquid containing a lithium ion may be used.

The ionic liquid denotes a salt which partly exhibits a liquid state under the room temperature. The term "room temperature" denotes the temperature range within which the power source is assumed to be operated in general. The upper limit of the temperature range within which the power source is assumed to be operated in general is about 120° C., or about 60° C. in some cases, and the lower limit is about −40° C. or about −20° C. in some cases.

As the lithium salt, lithium salts having a wide potential window as those utilized usually in nonaqueous electrolyte batteries are used. Examples of the lithium salts include, though not limited to, LiBF$_4$, LiPF$_6$, LiClO$_4$, LiCF$_3$SO$_3$, LiN(CF$_3$SO$_2$)$_2$, LiN(C$_2$F$_5$SO$_2$) and LiN(CF$_3$SC(C$_2$F$_5$SO$_2$)$_3$. These compounds may be used either singly or in combinations of two or more.

The content of the lithium salt is 0.1 to 3.0 mol/L and particularly preferably 1.0 to 2.0 mol/L. When the content of the lithium salt is 0.1 mol/L or more, the resistance of the electrolyte can be reduced and it is therefore possible to improve its discharge performance under a large current or at lower temperatures. When the content of the lithium salt is designed to be 3.0 mol/L or less, the melting point of the electrolyte can be dropped to keep a liquid state at room temperature.

The ionic liquid is those containing a quaternary ammonium organic cation having a skeleton represented by the formula (1), or those containing an imidazolium cation having a skeleton represented by the formula (2).

Formula (1)

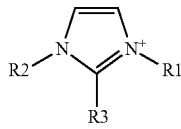

Formula (2)

where R1 and R2 respectively represent $C_nH_{2n+1}$ (n=1 to 6) and R3 represents H or $C_nH_{2n+1}$ (n=1 to 6).

Examples of the quaternary ammonium organic cation having a skeleton represented by the formula (1) include, though not limited to, imidazolium ions such as ions of dialkylimidazolium or trialkylimidazolium, tetraalkylammonium ions, alkylpyridinium ions, pyrazolium ions, pyrrolidinium ions and piperidinium ions. Particularly, imidazolium cations having a skeleton represented by the formula (2) are preferable.

Examples of the tetraalkylammonium ion include, though not limited to, trimethylethylammonium ions, trimethylpropylammonium ions, trimethylhexylammonium ions and tetrape Also, examples of the alkylpyridinium ions include, though not limited to, N-methylpyridinium ions, N-ethylpyridinium ions, N-propylpyridinium ions, N-butylpyridinium ions, 1-ethyl-2-methylpyridinium ions, 1-butyl-4-methylpyridinium ions and 1-butyl-2,4-dimethylpyridinium ions.

These ionic liquids having a cation may be used either singly or in combinations of two or more.

Examples of the imidazolium cation represented by the formula (2) include, though not limited to, dialkylimidazolium ions and trialkylimidazolium ions.

Examples of the dialkylimidazolium ions include, though not limited to, 1,3-dimethylimidazolium ions, 1-ethyl-3-methylimidazolium ions, 1-methyl-3-ethylimidazolium ions, 1-methyl-3-butylimidazolium ions and 1-butyl-3-methylimidazolium ions.

Examples of the trialkylimidazolium ions include, though not limited to, 1,2,3-trimethylimidazolium ions, 1,2-dimethyl-3-ethylimidazolium ions, 1,2-dimethyl-3-propylimidazolium ions and 1-butyl-2,3-dimethylimidazolium ions.

It should be noted that these ionic liquids having these cations may be used either singly or in combinations of two or more.

5) Case

As the above case, a metallic container having a plate thickness of 0.5 mm or less or a laminate film container having a film thickness of 0.2 mm or less may be used. As the above metallic container, metallic cans which are made of aluminum, an aluminum alloy, iron or stainless steel and have a rectangular form or cylindrical form may be used. The plate thickness of the metallic container is more preferably designed to be 0.2 mm or less.

As the laminate film, a multilayer film obtained by coating a metal foil with a resin film may be used. As the resin, polymers such as polypropylene (PP), polyethylene (PE), nylon and polyethylene terephthalate (PET) may be used.

As the aluminum alloy constituting the metallic container, alloys containing elements such as magnesium, zinc and silicon are preferable. On the other hand, the content of transition metals such as iron, copper, nickel and chromium is preferably 1% or less. This makes it possible to outstandingly improve the long-term reliability and radiation ability of the battery at high temperature.

The metallic can made of aluminum or an aluminum alloy has an average crystal grain size of preferably 50 μm or less and more preferably 30 μm or less. The average crystal grain size is still more preferably 5 μm or less. When the above average crystal grain size is 50 μm or less, the strength of the metallic can made of aluminum or an aluminum alloy can be outstandingly increased, which allows the can to be thinner. As a result, a battery which is light-weight, has high output, exhibits long-term reliability and is therefore suitable battery to be mounted on vehicles.

6) Negative Electrode

The negative electrode terminal may be formed from a material having electric stability and conductivity at a potential range from 0.4 to 3 V with respect to a lithium metal potential. Example of this material include aluminum and aluminum alloys containing elements such as Mg, Ti, Zn, Mn, Fe, Cu and Si. In order to reduce contact resistance, the material is preferably the same as that of the negative electrode current collector.

7) Positive Electrode

The positive electrode terminal may be formed from a material having electric stability and conductivity at a potential range from 3 V to 5 V with respect to a lithium metal potential. Example of this material include aluminum and aluminum alloys containing elements such as Mg, Ti, Zn, Mn, Fe, Cu and Si. In order to reduce contact resistance, the material is preferably the same as that of the positive electrode current collector.

Figure 4:
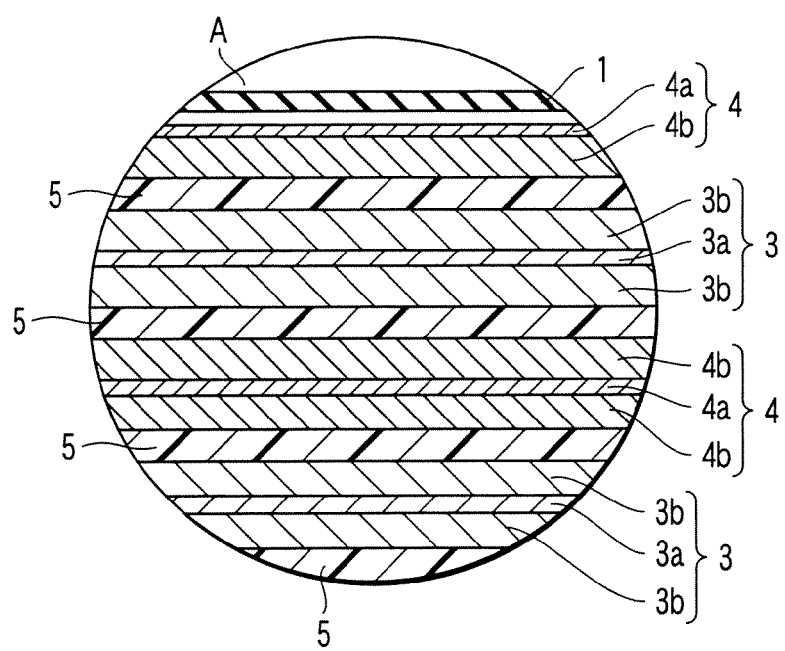
FIG. 4 is a typical view showing a partial section of the part enclosed by the circle shown by A in FIG. 3 in detail.
Figure 6:
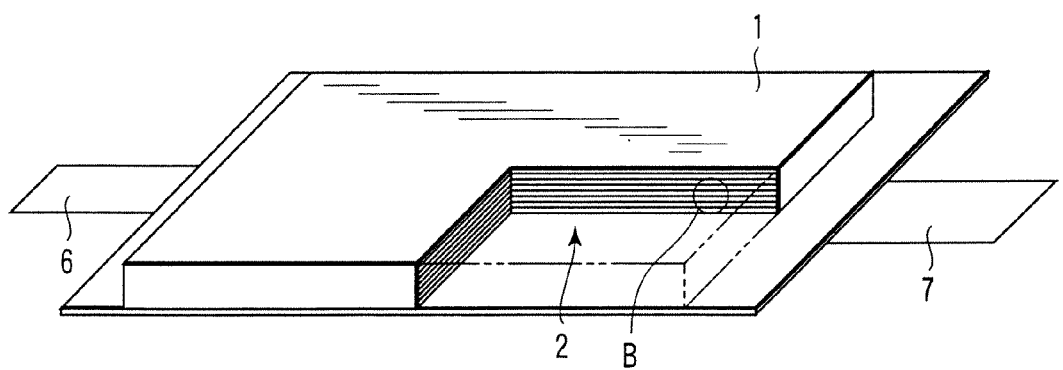
FIG. 6 is a partially cutaway and perspective view typically showing another flat type nonaqueous electrolyte secondary battery according to the first embodiment.
Figure 7:
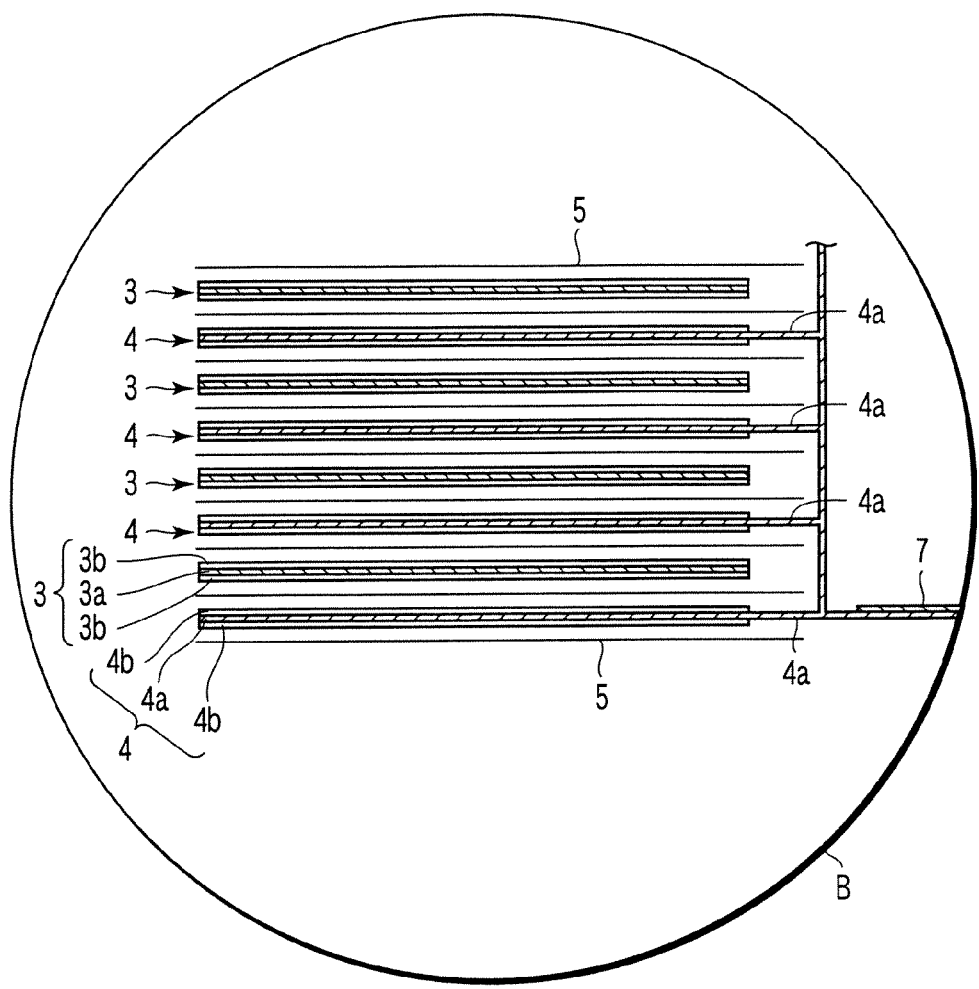
FIG. 7 is an enlarged sectional view of the part B of FIG. 6.

The nonaqueous electrolyte battery according to the first embodiment is not limited to the structures shown in the above FIGS. 3 to 5 but may have the structures shown, for example, in FIGS. 6 and 7.

As shown in FIG. 6, a stack type electrode group 2 is housed in a case 1 formed of a laminate film. As shown in FIG. 7, the stack type electrode group 2 is constructed such that a positive electrode 3 and a negative electrode 4 are stacked one upon the other a plurality of times alternately with a separator 5 interposed between the positive electrode 3 and the negative electrode 4. The electrode group 2 includes a plurality of the positive electrodes 3 each comprising a positive electrode current collector 3a and positive electrode active material-containing layers 3b supported on both surfaces of the positive electrode current collector 3a. The electrode group 2 also includes a plurality of the negative electrodes 4 each comprising a negative electrode current collector 4a and negative electrode active material-containing layers 4b supported on both surfaces of the negative electrode current collector 4a. One side of the negative electrode current collector 4a included in the negative electrode 4 protrudes from the positive electrode 3. The negative electrode current collector 4a protruding from the positive electrode 3 is electrically connected to a band-like negative electrode terminal 7. The tip portion of the band-like negative electrode terminal 7 is drawn to the outside from the case 1. Also, that side of the positive electrode current collector 3a included in the positive electrode 3 which is positioned on the side opposite to the protruding side of the negative electrode current collector 4a, though the protruding side of the positive electrode current collector 3a is not shown in the drawing. The positive electrode current collector 3a protruding from the negative electrode 4 is electrically connected to a band-like positive electrode terminal 6. The tip portion of the band-like positive electrode terminal 6 is positioned on the side opposite to the side of the negative electrode terminal 7 and is drawn to the outside from a side of case 1. In the flattened nonaqueous electrolyte secondary battery shown in FIGS. 6 and 7, the positive electrode terminal 6 and the negative electrode terminal 7 are drawn to the outside from the mutually facing two sides of the case 1.

Figure 8:
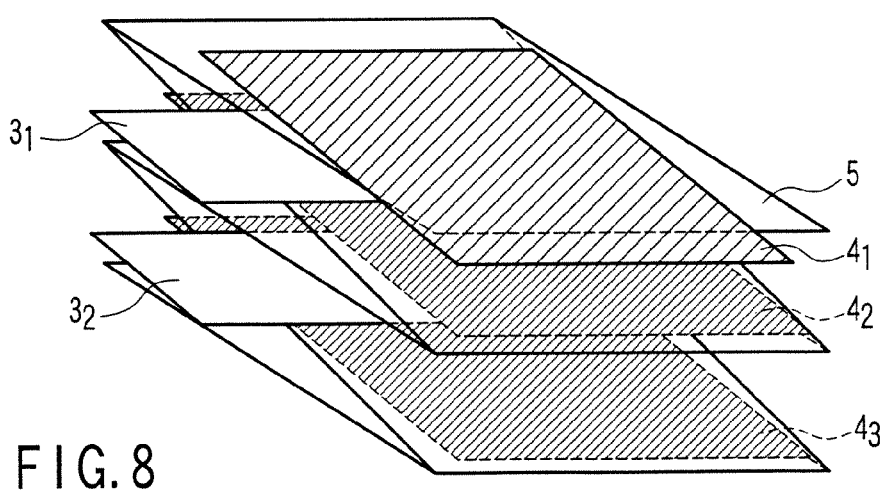
FIG. 8 is a perspective view showing an electrode group having a laminate structure and used in the nonaqueous electrolyte battery according to the first embodiment.

As the structure of the electrode group, a coil structure as shown in the aforementioned FIGS. 3 to 5 and a laminate structure as shown in the aforementioned FIGS. 6 and 7 were given as examples. It is preferable that the electrode structure have a laminate structure to provide high safety and reliability in addition to excellent input and output performance. Moreover, in order to attain high performance under a high current even when the battery is used for a long time, it is preferable to adopt a structure in which the electrode group containing a positive electrode and a negative electrode have a laminate structure and the separator is folded in a zigzag shape upon use as shown in FIG. 8. A band separator 5 is folded in a zigzag shape. A strip negative electrode $4_1$ is laminated on the uppermost layer of the separator 5 folded in a zigzag shape. A strip positive electrode $3_1$, a strip negative electrode $4_2$, a strip positive electrode $3_2$ and a strip negative electrode $4_3$ are each inserted in this order from above into a part where the separators 5 are overlapped on each other. The positive electrodes 3 and the negative electrodes 4 are alternately arranged between the separators 5 piled in a zigzag shape to thereby obtain an electrode group having a laminate structure.

The reason why such a laminate structure is adopted and the separator is folded in a zigzag shape will be explained.

The separator is designed to have a median diameter larger than a mode diameter to attain high performance under a large current. Namely, large pores are made to be present in the separator. This reduces the piercing strength of the separator itself. When a positive electrode and a negative electrode are spirally coiled through a separator and then molded into a flat form to obtain an electrode group having a coil structure, the electrode is bent sharply at the edge part, so that the active material-containing layer is broken, with the result that the broken active material-containing layer pierces the separator with increasing frequency. In short, defective batteries are produced with increasing frequency because of developments of internal short-circuits in the production of these batteries. Therefore, the electrode group is preferably designed to have a laminate structure free from the necessity for bending the electrode.

Moreover, even in the case where the electrode group has a laminate structure, it is preferable to arrange the separator put in the form folded in a zigzag shape. When the separator is designed to have a median diameter larger than a mode diameter and large pores are made to be present in the separator, the mobility of the nonaqueous electrolyte in the separator due to capillary action is dropped. When the separator is folded in a zigzag shape, the three sides of each of the positive electrode and negative electrode are directly in contact with the nonaqueous electrolyte not through the separator and therefore, the nonaqueous electrolyte smoothly penetrates to the electrodes. Therefore, even if the nonaqueous electrolyte is consumed on the surface of the electrodes after the battery is used for a long time, the nonaqueous electrolyte is supplied smoothly, making it possible to attain excellent performance (input and output performance) under a large current for a long period. When a structure is adopted in which the separator has a bag form or the like though this structure has the same laminate structure, electrodes provided in the bag are in direct contact with the nonaqueous electrolyte only on one side and it is therefore difficult to supply the nonaqueous electrolyte smoothly. Therefore, when the nonaqueous electrolyte is consumed on the surface of the electrodes after the battery is used for a long time, the nonaqueous electrolyte is not supplied smoothly, bringing about gradually deteriorated performance (output and input performance) under a large current along with an increase in the frequency of use.

From the above results, it is preferable that the electrode group comprising a positive electrode and a negative electrode have a laminate structure and the separator isolating the positive electrode from the negative electrode spatially be arranged in such a manner that it is folded in a zigzag shape.

(Second Embodiment)

The battery pack according to a second embodiment comprises at least one nonaqueous electrolyte battery according to the first embodiment. It is desirable to structure a battery module by using, as a unit cell, the nonaqueous electrolyte battery according to the first embodiment and by connecting two or more of the unit cells electrically in series or in parallel.

The nonaqueous electrolyte battery according to the first embodiment is suitable to the formation of a battery module and the battery pack according to the second embodiment has excellent cycle performance. The details will be explained below.

When the ability of retaining the nonaqueous electrolyte is improved, the entire surface of the negative electrode active material can be in contact with the nonaqueous electrolyte and it becomes easy to equalize the concentration of lithium ions in the negative electrode active material. As a result, over voltage is applied with difficulty. Specifically, local overcharge and overvoltage are scarcely caused, and it is therefore possible to equalize the utilization factor of the negative electrode active material. This makes it possible to significantly reduce an individual difference in the capacities or impedances of the batteries. As a result, in a battery module formed of unit cells connected in series, for example, variations in the voltages of the fully charged unit cells along with the individual difference in the capacities of the unit cells can be decreased. Therefore, the battery pack according to the second embodiment is excellent in the controllability of the battery module and can improve the cycle performance.

Figure 9:
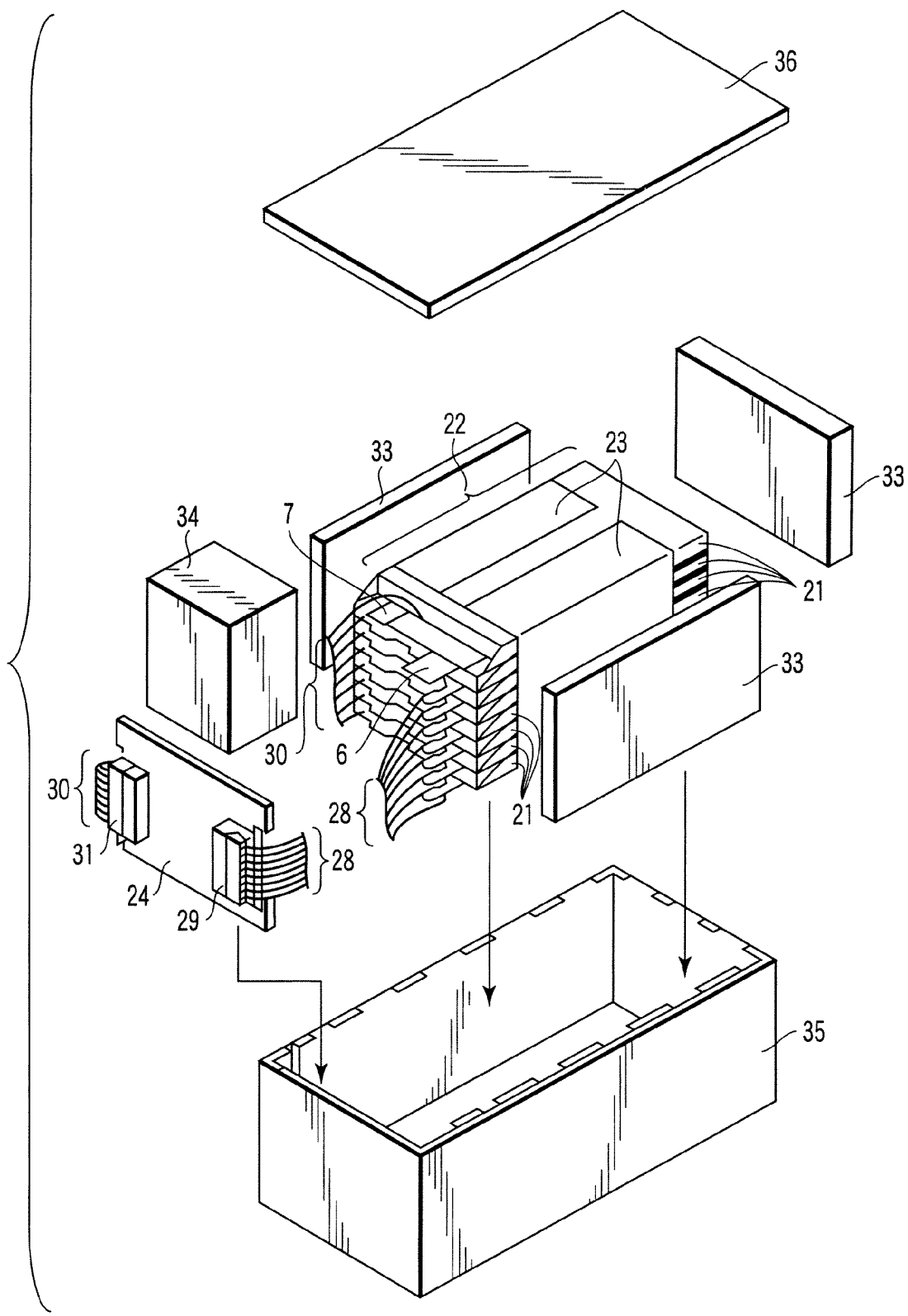
FIG. 9 is an exploded perspective view of a battery pack according to a second embodiment.
Figure 10:
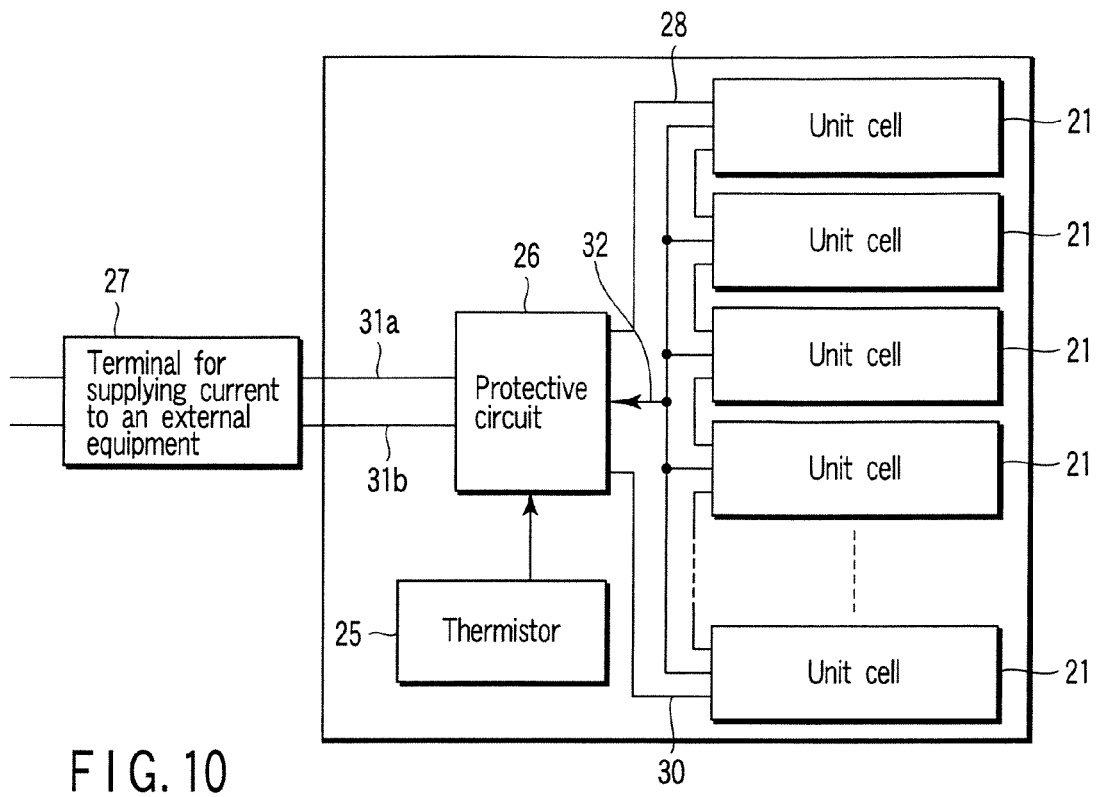
FIG. 10 is a block diagram showing an electric circuit of the battery pack of FIG. 9.

Each of a plurality of unit cells 21 included in the battery pack shown in FIG. 9 is formed of, though not limited to, a flattened type nonaqueous electrolyte battery constructed as shown in FIG. 3. It is possible to use the flattened type nonaqueous electrolyte battery shown in FIG. 6 as the unit cell 21. The plural unit cells 21 are stacked one upon the other in the thickness direction in a manner to align the protruding directions of the positive electrode terminals 6 and the negative electrode terminals 7. As shown in FIG. 10, the unit cells 21 are connected in series to form a battery module 22. The unit cells 21 forming the battery module 22 are made integral by using an adhesive tape 23 as shown in FIG. 9.

A printed wiring board 24 is arranged on the side surface of the battery module 22 toward which protrude the positive electrode terminals 6 and the negative electrode terminals 7. As shown in FIG. 10, a thermistor 25, a protective circuit 26 and a terminal 27 for current supply to the external equipment are connected to the printed wiring board 24.

As shown in FIGS. 9 and 10, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over-current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium electrodes used as reference electrodes are inserted into the unit cells 21.

In the case of FIG. 10, a wiring 32 is connected to each of the unit cells 21 for detecting the voltage, and the detection signal is transmitted through these wirings 32 to the protective circuit 26.

Protective sheets 33 each formed of rubber or resin are arranged on the three of the four sides of the battery module 22, though the protective sheet 33 is not arranged on the side toward which protrude the positive electrode terminals 6 and the negative electrode terminals 7. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 9 and 10 are connected in series. However, it is also possible to connect the unit cells 21 in parallel to increase the cell capacity. Of course, it is possible to connect the battery packs in series and in parallel.

Also, the embodiments of the battery pack can be changed appropriately depending on the use of the battery pack.

With regard to the applications of the battery pack of the second embodiment, those are used in the field requiring the large current performance and the charge-discharge cycle. Specifically, examples of the applications include battery packs to be used as power sources for digital cameras and battery packs to be installed in vehicles such as two- to four-wheeled hybrid automobiles, two- to four-wheeled automobiles, and electric mopeds. Particularly those to be installed in vehicles are preferable.

In this case, when the nonaqueous electrolyte contains a mixture solvent prepared by blending at least two types selected from the group consisting of propylene carbonate (PC), ethylene carbonate (EC) and γ-butyrolactone (GBL), or γ-butyrolactone (GBL), applications for which high-temperature performance is desired are preferable. Specifically, the aforementioned vehicle applications are exemplified.

(Third Embodiment)

A vehicle according to a third embodiment of the present invention comprises the battery pack according to the second embodiment. The vehicle noted above includes, for example, a hybrid electric automobile having 2 to 4 wheels, an electric automobile having 2 to 4 wheels, and an electric moped.

FIGS. 11 to 13 show various type of hybrid vehicles in which an internal combustion engine and a motor driven by a battery module system are used in combination as the power source for the driving. For driving the vehicle, required is the power source exhibiting a wide range of the rotation speed and the torque depending on the running conditions of the vehicle. Since the torque and rotation speed exhibiting an ideal energy efficiency are limited in the internal combustion engine, the energy efficiency is lowered under the driving conditions other than the limited torque and the rotation speed. Since the hybrid vehicle includes the internal combustion engine and the electric motor, it is possible to improve the energy efficiency of the vehicle. Specifically, the internal combustion engine is operated under the optimum conditions so as to generate an electric power, and the wheels are driven by a high-efficiency electric motor, or the internal combustion engine and the electric motor are operated simultaneously, thereby improving the energy efficiency of the vehicle. Also, by recovering the kinetic energy of the vehicle in the decelerating stage as the electric power, the running distance per unit amount of the fuel can be drastically increased, compared with the vehicle that is driven by the internal combustion engine alone.

The hybrid vehicle can be roughly classified into three types depending on the combination of the internal combustion engine and the electric motor.

FIG. 11 shows a hybrid vehicle 50 that is generally called a series hybrid vehicle. The motive power of an internal combustion engine 51 is once converted entirely into an electric power by a power generator 52, and the electric power thus converted is stored in a battery pack 54 via an inverter 53. The battery pack according to the second embodiment is used as the battery pack 54. The electric power stored in the battery pack 54 is supplied to an electric motor 55 via the inverter 53, with the result that wheels 56 are driven by the electric motor 55. In other words, the hybrid vehicle 50 shown in FIG. 11 represents a system in which a power generator is incorporated into an electric vehicle. The internal combustion engine can be operated under highly efficient conditions and the kinetic energy of the internal combustion engine can be recovered as the electric power. On the other hand, the wheels are driven by the electric motor alone and, thus, the hybrid vehicle 50 requires an electric motor of a high output. It is also necessary to use a battery pack having a relatively large capacity. It is desirable for the rated capacity of the battery pack to fall within a range of 5 to 50 Ah, more desirably 10 to 20 Ah. Incidentally, the rated capacity noted above denotes the capacity at the time when the battery pack is discharged at a rate of 0.2 C.

FIG. 12 shows the construction of a hybrid vehicle 57 that is called a parallel hybrid vehicle. A reference numeral 58 shown in FIG. 12 denotes an electric motor that also acts as a power generator. The internal combustion engine 51 drives mainly the wheels 56. The motive power of the internal combustion engine 51 is converted in some cases into an electric power by the power generator 58, and the battery pack 54 is charged by the electric power produced from the power generator 58. In the starting stage or the accelerating stage at which the load is increased, the driving force is supplemented by the electric motor 58. The hybrid vehicle 57 shown in FIG. 12 represents a system based on the ordinary vehicle. In this system, the fluctuation in the load of the internal combustion engine 51 is suppressed so as to improve the efficiency, and the regenerative power is also obtained. Since the wheels 56 are driven mainly by the internal combustion engine 51, the output of the electric motor 58 can be determined arbitrarily depending on the required ratio of the assistance. The system can be constructed even in the case of using a relatively small electric motor 58 and a relatively small battery pack 54. The rated capacity of the battery pack can be set to fall within a range of 1 to 20 Ah, more desirably 5 to 10 Ah.

FIG. 13 shows the construction of a hybrid vehicle 59 that is called a series-parallel hybrid vehicle, which utilizes in combination both the series type system and the parallel type system. A power dividing mechanism 60 included in the hybrid vehicle 59 divides the output of the internal combustion engine 51 into the energy for the power generation and the energy for the wheel driving. The series-parallel hybrid vehicle 59 permits controlling the load of the engine more finely than the parallel hybrid vehicle so as to improve the energy efficiency.

It is desirable for the rated capacity of the battery pack to fall within a range of 1 to 20 Ah, more desirably 5 to 10 Ah.

It is desirable for the nominal voltage of the battery pack included in the hybrid vehicles as shown in FIGS. 11 to 13 to fall within a range of 200 to 600 V.

The battery pack according to embodiments of the present invention is adapted for use in the series-parallel hybrid vehicle.

It is desirable for the battery pack 54 to be arranged in general in the site where the battery pack 54 is unlikely to be affected by the change in the temperature of the outer atmosphere and unlikely to receive an impact in the event of a collision. In, for example, a sedan type automobile shown in FIG. 14, the battery pack 54 can be arranged within a trunk room rearward of a rear seat 61. The battery pack 54 can also be arranged below or behind the rear seat 61. Where the battery has a large weight, it is desirable to arrange the battery pack 54 below the seat or below the floor in order to lower the center of gravity of the vehicle.

An electric vehicle (EV) is driven by the energy stored in the battery pack that is charged by the electric power supplied from outside the vehicle. Therefore, it is possible for the electric vehicle to utilize the electric energy generated at a high efficiency by, for example, another power generating equipment. Also, since the kinetic energy of the vehicle can be recovered as the electric power in the decelerating stage of the vehicle, it is possible to improve the energy efficiency during the driving of the vehicle. It should also be noted that the electric vehicle does not discharge at all the waste gases such as a carbon dioxide gas and, thus, the air pollution problem need not be worried about at all. On the other hand, since all the power required for the driving of the vehicle is produced by an electric motor, it is necessary to use an electric motor of a high output. In general, it is necessary to store all the energy required for one driving in the battery pack by one charging. It follows that it is necessary to use a battery pack having a very large capacity. It is desirable for the rated capacity of the battery pack to fall within a range of 100 to 500 Ah, more desirably 200 to 400 Ah.

The weight of the battery pack occupies a large ratio of the weight of the vehicle. Therefore, it is desirable for the battery pack to be arranged in a low position that is not markedly apart from the center of gravity of the vehicle. For example, it is desirable for the battery pack to be arranged below the floor of the vehicle. In order to allow the battery pack to be charged in a short time with a large amount of the electric power required for the one driving, it is necessary to use a charger of a large capacity and a charging cable. Therefore, it is desirable for the electric vehicle to be equipped with a charging connector connecting the charger and the charging cable. A connector utilizing the electric contact can be used as the charging connector. It is also possible to use a non-contact type charging connector utilizing the inductive coupling.

Figure 15:
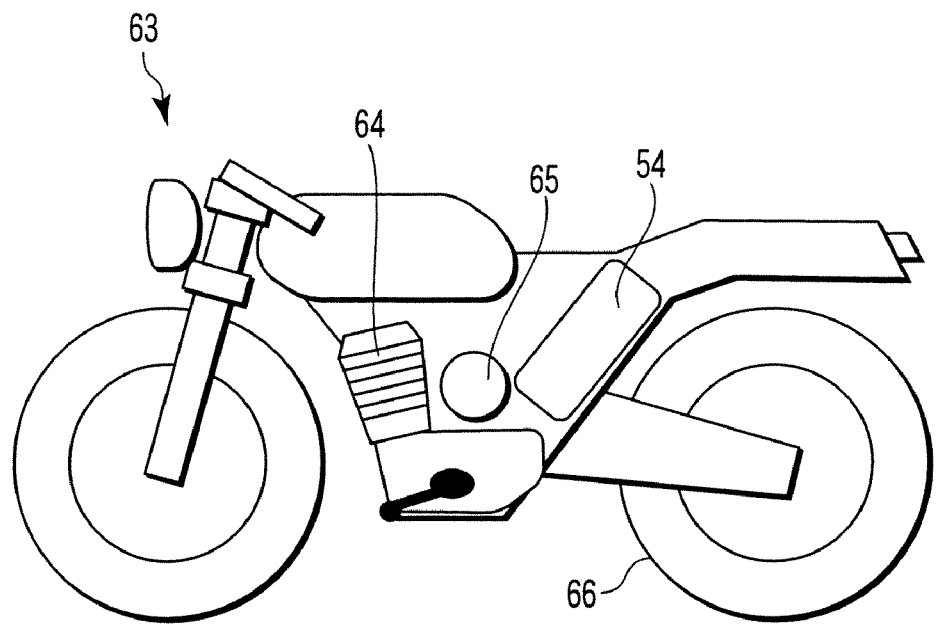
FIG. 15 is a typical view showing a hybrid motorcycle according to the third embodiment.

FIG. 15 exemplifies the construction of a hybrid motor bicycle 63. It is possible to construct a hybrid motor bicycle 63 exhibiting a high energy efficiency and equipped with an internal combustion engine 64, an electric motor 65, and the battery pack 54 like the hybrid vehicle. The internal combustion engine 64 drives mainly the wheels 66. In some cases, the battery pack 54 is charged by utilizing a part of the motive power generated from the internal combustion engine 64. In the starting stage or the accelerating stage in which the load of the motor bicycle is increased, the driving force of the motor bicycle is supplemented by the electric motor 65. Since the wheels 66 are driven mainly by the internal combustion engine 64, the output of the electric motor 65 can be determined arbitrarily based on the required ratio of the supplement. The electric motor 65 and the battery pack 54, which are relatively small, can be used for constructing the system. It is desirable for the rated capacity of the battery pack to fall within a range of 1 to 20 Ah, more desirably 3 to 10 Ah.

Figure 16:
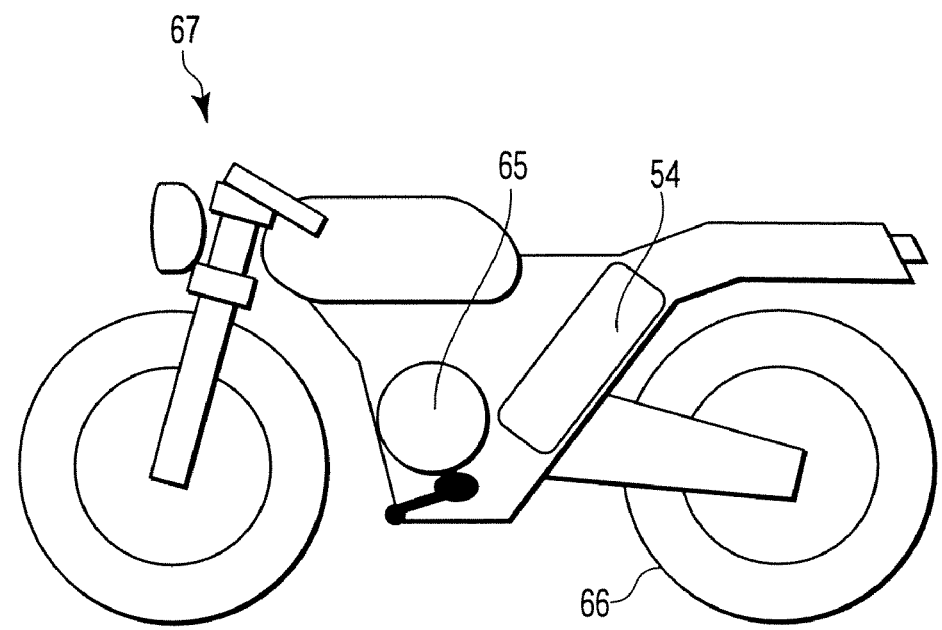
FIG. 16 is a typical view showing an electric motorcycle according to the third embodiment.

FIG. 16 exemplifies the construction of an electric motor bicycle 67. The electric motor bicycle 67 is driven by the energy stored in the battery pack 54 that is charged by the supply of the electric power from the outside. Since all the driving force required for the driving the motor bicycle 67 is generated from the electric motor 65, it is necessary to use the electric motor 65 of a high output. Also, since it is necessary for the battery pack to store all the energy required for one driving by one charging, it is necessary to use a battery pack having a relatively large capacity. It is desirable for the rated capacity of the battery pack to fall within a range of 10 to 50 Ah, more desirably 15 to 30 Ah.

Figure 17:
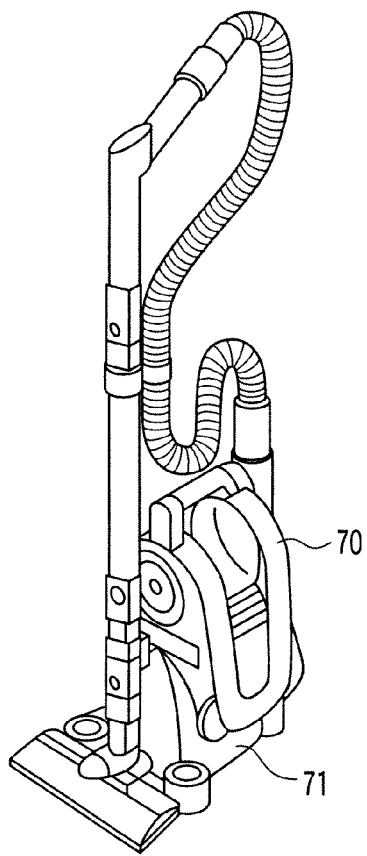
FIG. 17 is a typical view showing a chargeable vacuum cleaner according to the third embodiment.

FIG. 17 shows an example of a chargeable vacuum cleaner according to the third embodiment of the present invention. The chargeable vacuum cleaner comprises a battery pack according to the second embodiment, the pack being stored in a casing 70 of the vacuum cleaner. Also, the chargeable vacuum cleaner is provided with a charger 71 which doubles as a support stand. The rated capacity of the battery pack is preferably designed to be in the range of 2 to 10 Ah. A more preferable range is from 2 to 4 Ah. Also, the nominal voltage of the battery pack is preferably designed to be in the range of 40 to 80 V.

Typical examples are given below to explain the present invention in more detail. However, these written examples are not intended to limit the present invention, and modifications and variations of these examples are embraced in the present invention within the spirit and scope of the present invention.

EXAMPLE 1

<Production of a Positive Electrode>

First, as positive electrode active materials, 90% by weight of a lithium cobalt oxide (LiCoO$_2$) powder, 3% by weight of acetylene black, 3% by weight of graphite and 4% by weight of polyvinylidene fluoride (PVdF) were added in a N-methylpyrrolidone (NMP) to prepare a slurry. The obtained slurry was applied to both surfaces of a current collector made of an aluminum foil having a thickness of 15 μm and an average crystal grain size of 30 μm, followed by drying and pressing to manufacture a positive electrode having an electrode density of 3.0 g/cm$^3$ and a surface roughness Ra(+) of 0.15 μm.

<Production of a Negative Electrode>

As a negative electrode active material, lithium titanate was prepared which had an average particle diameter of 0.7 μm, represented by Li$_4$Ti$_5$O$_{12}$, had a Lithium ion insertion potential of 1.55 V (vs. Li/Li$^+$) and had a spinel structure. The negative electrode active material, acetylene black as an electroconductive material and polyvinylidene fluoride (PVdF) having an average molecular weight of 4×10$^5$ were added in a ratio of 95:2.5:2.5 to a N-methylpyrrolidone (NMP) solvent and these components were mixed to prepare a slurry. The obtained slurry was applied to an aluminum foil having a thickness of 15 μm and an average crystal grain size of 30 μm, followed by drying and pressing to manufacture a negative electrode having an electrode density of 2.2 g/cm$^3$. The surface roughness Ra(−) of the negative electrode was 0.3 μm.

<Particle Diameter>

Specifically, about 0.1 g of a sample, a surfactant, and 1 to 2 mL of a distilled water were put in a beaker, and the distilled water was sufficiently stirred, followed by pouring the stirred system in a stirring water vessel. Under this condition, the light intensity distribution was measured every 2 seconds and measured 64 times in total by using SALD-300, which is a Laser Diffraction Particle Size Analyzer manufactured by Shimadzu Corporation, to analyze the particle diameter distribution data.

<Lithium Ion Insertion Potential>

The negative electrode was cut into small pieces each sized at 2 cm×2 cm to obtain working electrodes. The working electrode was arranged to face a counter electrode formed of a lithium metal foil sized at 2.2 cm×2.2 cm with a glass filter (separator) interposed therebetween, and a lithium metal used as a reference electrode was inserted so as not to be brought into contact with any of the working electrode and the counter electrode. These electrodes were put in a glass cell of a three pole type such that each of the working electrode, the counter electrode and the reference electrode was connected to the terminal of the glass cell. Under the particular condition, 25 mL of an electrolysis solution, which was prepared by dissolving LiBF$_4$ in a concentration of 1.5 mol/L in a mixed solvent prepared by mixing ethylene carbonate (EC) and γ-butyrolactone (GBL) in a mixing ratio by volume of 1:2, was poured into the glass cell such that the separator and the electrodes were sufficiently impregnated with the electrolysis solution, followed by hermetically closing the glass cell. The glass cell thus manufactured was arranged in a constant temperature bath maintained at 25° C. to measure the lithium ion insertion potential of the working electrode at the time when the glass cell was charged with a current density of 0.1 mA/cm$^2$.

<Separator>

As the separator, a polyethylene porous film 20 μm in thickness was prepared which had the characteristics that the porosity measured by the mercury porosimetry was 35% and the mode diameter and median diameter of the pore diameter distribution measured by the mercury porosimetry was 0.18 μm and 0.21 μm, respectively.

The porosity, the mode diameter and median diameter were calculated from the pore diameter distribution of the separator measured by the mercury porosimetry. As a device for measuring the pore diameter distribution, Autopore 9520 model manufactured by Shimadzu Corporation was used. The sample was cut into strips of a size of about 25×25 mm$^2$ and the strip was folded and taken in a measuring cell to measure in the condition that the initial pressure was 20 kPa corresponds to about 3 psia and is a pressure corresponding to the pore diameter of about 60 μm. When rearranging data, the specific surface area of pores was calculated on the premise that the pores each had a cylindrical form.

It should be noted that the analytical principle of the mercury porosimetry is based on Washburn's equation (1):

$$D = -4\gamma \cos \theta / P \qquad \text{Equation (1)}$$

Here, P is a pressure to be applied, D is a pore diameter, γ is the surface tension of mercury and is 480 dyne·cm$^{-1}$, and θ is a contact angle of mercury with the wall surface of pores and is 140°. γ and θ are constants and therefore, the relation between the applied pressure P and the pore diameter D is found from Washburn's equation. If mercury penetration volume at this time is measured, the pore diameter and its volumetric distribution can be found. As to the details of measuring method, principle and the like, please refer to, for example, Motoji Zimpo et al., "Microparticle Handbook" Asakura Shoten, (1991) and Sohachiro Hayakawa, "Powder Property Measuring Method", Asakura Shoten (1978).

Figure 18:
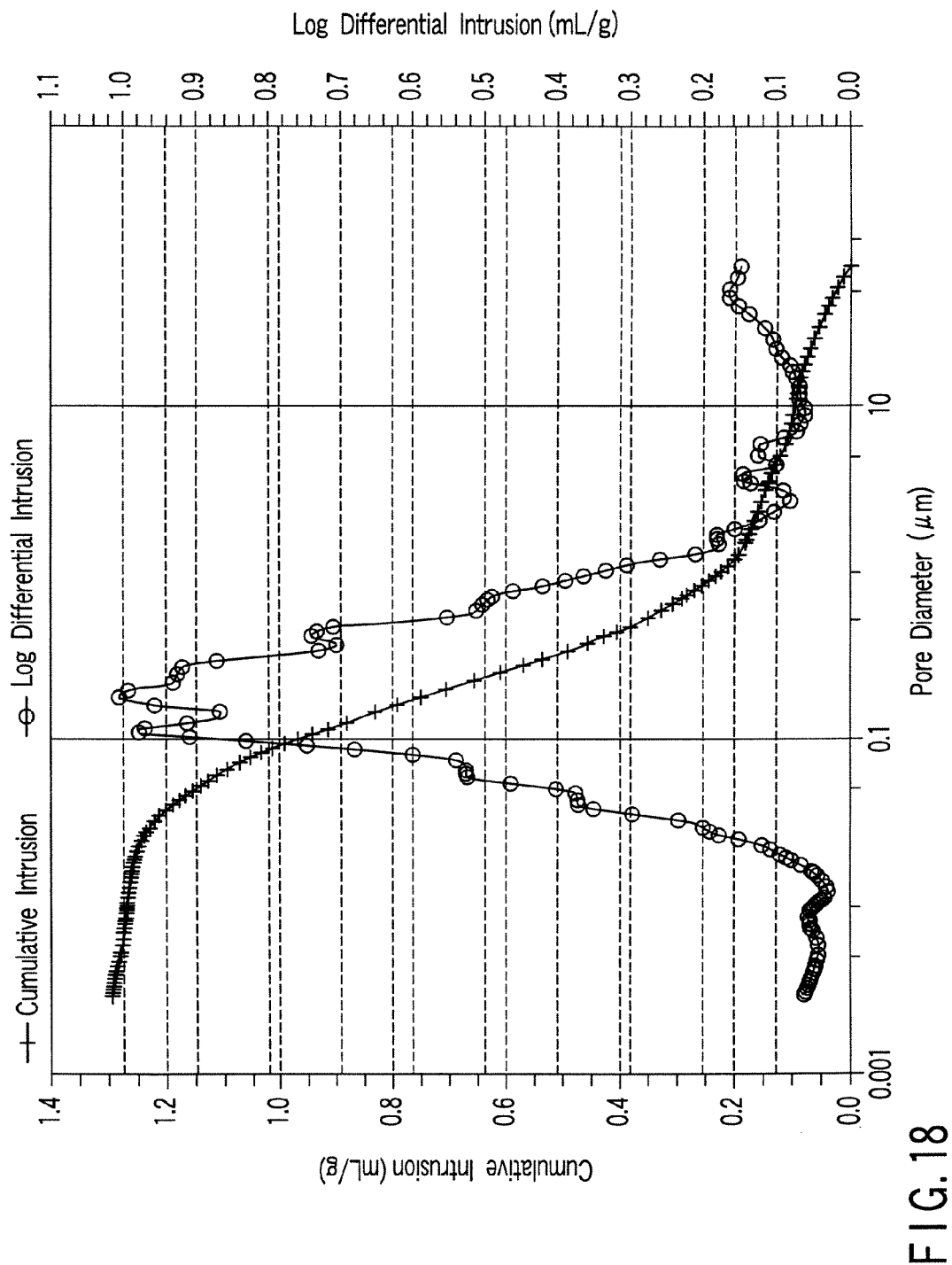
FIG. 18 is a view showing the distribution of pore diameter in a separator used in a nonaqueous electrolyte battery of Example 1, which distribution is measured by mercury porosimetry.

The obtained pore diameter distribution is shown in FIG. 18. The ordinate on the right side in FIG. 18 is the log differential intrusion and the ordinate on the left side is the cumulative intrusion. The mode diameter is the pore diameter at the peak top on the log differential intrusion and is 0.18 μm in the case of FIG. 18. Also, the median diameter is the pore diameter when the cumulative volume frequency on the cumulative distribution curve is 50% and is 0.21 μm in the case of FIG. 18.

<Preparation of an Electrode Group>

The positive electrode, the separator, the negative electrode and the separator were laminated in this order and the separator was arranged in the form folded in a zigzag shape, to constitute an electrode group. This electrode group was pressed under heating at 90° C. to manufacture a flat electrode group having a size of 70×100 mm and a thickness of 3.0 mm. The obtained electrode group was accommodated in a pack made of a 0.1-mm-thick laminate film constituted of a 40-μm-thick aluminum foil and a propylene film formed on both sides of the aluminum foil and was subjected to vacuum drying carried out at 80° C., for 24 hours.

<Preparation of a Liquid Nonaqueous Electrolyte>

1.5 mol of lithium tetrafluoroborate (LiBF$_4$) was dissolved as an electrolyte in a mixture solvent of ethylene carbonate (EC) and γ-butyrolactone (BL) (volume ratio: 25:75) to prepare a liquid nonaqueous electrolyte (nonaqueous electrolyte solution).

After the above liquid nonaqueous electrolyte was poured into the laminate film pack in which the above electrode group was received, the above pack was sealed by heat seal to manufacture a nonaqueous electrolyte secondary battery having the structure shown in the above FIG. 6, a size of 80×120 mm and thickness of 3.0 mm.

Also, in order to measure the electric double layer capacity, a three-pole cell was manufactured by the method explained below.

A positive electrode and a negative electrode each 2 cm×2 cm in size and a separator 3 cm×3 cm in size were produced by punching. The positive electrode and the negative electrode were made to face each other through the separator and subjected to vacuum drying carried out at 80° C. for 24 hours to obtain a three-pole cell electrode group.

A metal lithium was provided as a reference electrode in the vicinity of the three-pole electrode group and was sealed together with the above liquid nonaqueous electrolyte in a closed container to manufacture a three-pole cell.

EXAMPLES 2 to 11

Comparative Examples 1 to 4 and 6

Nonaqueous electrolyte secondary batteries and three-pole cells were manufactured in the same manner as in Example 1 except that as each surface roughness of the positive electrode and the negative electrode, the porosity of the separator, the mode diameter and median diameter measured by the mercury porosimetry, those shown in Table 1 were used.

A nonaqueous electrolyte secondary battery and a three-pole cell were manufactured in the same manner as in Example 1 except that the above negative electrode, a positive electrode having the surface roughness shown in FIG. 1 and a separator having the porosity and the mode diameter and median diameter measured by the mercury porosimetry as shown in Table 1 were used.

Using the manufactured three-pole cell, the battery was initially charged at 45° C. and each AC impedance of the positive electrode and the negative electrode was measured at an SOC of 100% to thereby measure each electric double layer capacity.

Moreover, the manufactured secondary batteries were made to charge up to a SOC of 50% at 25° C. in five minutes to measure the input density (W/kg) at this time. Also, the secondary batteries were put into the same state of SOC of 50% to measure the output density (W/kg) when it was discharged in five seconds at 25° C. The results of the above tests are described collectively in Table 1.

TABLE 1

|  | Positive electrode surface roughness Ra(+) (µm) | Negative electrode surface roughness Ra(−) (µm) | Porosity (%) | Median diameter (µm) | Mode diameter (µm) | Ra(−)/mode diameter | Positive electrode electric double layer capacity (F/cm$^2$) | Negative electrode electric double layer capacity (F/cm$^2$) | Input density (5 seconds, SOC 50%) (W/kg) | Output density (5 seconds, SOC 50%) (W/kg) |
|---|---|---|---|---|---|---|---|---|---|---|
| Example 1 | 0.15 | 0.3 | 55 | 0.21 | 0.18 | 1.67 | 0.015 | 0.0002 | 3750 | 2950 |
| Example 2 | 0.15 | 0.3 | 63 | 0.21 | 0.18 | 1.67 | 0.015 | 0.00025 | 3850 | 3050 |
| Example 3 | 0.15 | 0.3 | 50 | 0.21 | 0.18 | 1.67 | 0.013 | 0.00018 | 3650 | 2850 |
| Example 4 | 0.3 | 0.3 | 55 | 0.21 | 0.18 | 1.67 | 0.018 | 0.0002 | 3950 | 3100 |
| Example 5 | 0.1 | 0.3 | 55 | 0.21 | 0.15 | 2 | 0.015 | 0.00018 | 3700 | 2900 |
| Example 6 | 0.6 | 0.6 | 55 | 0.5 | 0.4 | 1.5 | 0.019 | 0.0002 | 3900 | 3150 |
| Example 7 | 0.6 | 0.6 | 55 | 0.5 | 0.3 | 2 | 0.019 | 0.00018 | 3850 | 3050 |
| Example 8 | 0.3 | 0.6 | 55 | 0.5 | 0.4 | 1.5 | 0.015 | 0.00019 | 3800 | 3000 |
| Example 9 | 0.1 | 0.1 | 55 | 0.1 | 0.05 | 2 | 0.015 | 0.00017 | 3650 | 2850 |
| Example 10 | 0.08 | 0.08 | 50 | 0.1 | 0.05 | 1.6 | 0.010 | 0.00012 | 2650 | 2100 |
| Example 11 | 0.2 | 0.3 | 55 | 0.18 | 0.12 | 2.5 | 0.012 | 0.00015 | 2900 | 2350 |
| Comparative Example 1 | 0.2 | 0.3 | 40 | 0.21 | 0.18 | 1.67 | 0.005 | 0.0001 | 2200 | 1700 |
| Comparative Example 2 | 0.2 | 0.3 | 55 | 0.4 | 0.35 | 0.86 | 0.009 | 0.0001 | 2100 | 1600 |
| Comparative Example 3 | 0.2 | 0.3 | 40 | 0.4 | 0.35 | 0.86 | 0.004 | 0.0001 | 2000 | 1550 |
| Comparative Example 4 | 0.1 | 0.1 | 50 | 0.04 | 0.04 | 2.5 | 0.008 | 0.0001 | 2150 | 1650 |
| Comparative Example 5 | 0.3 | 0.85 | 55 | 0.45 | 0.4 | 2.13 | 0.015 | 0.0001 | 1950 | 1250 |
| Comparative Example 6 | 0.15 | 0.3 | 55 | 0.18 | 0.18 | 1.67 | 0.010 | 0.0001 | 2300 | 1750 |

Comparative Example 5

<Preparation of a Negative Electrode>

As a negative electrode active material, graphite was prepared which had an average particle diameter of 3 µm and had a Lithium ion insertion potential of 0.15 V (vs. Li/Li$^+$). The negative electrode active material, acetylene black as an electroconductive material and polyvinylidene fluoride (PVdF) having an average molecular weight of 4×10$^5$ were added in a ratio of 95:2.5:2.5 to a N-methylpyrrolidone (NMP) solvent and these components were mixed to prepare a slurry. The obtained slurry was applied to a copper foil having a thickness of 10 µm, followed by drying and pressing to manufacture a negative electrode having an electrode density of 1.5 g/cm$^3$. The surface roughness of the negative electrode at this time was 0.85 µm.

As is clear from Table 1, it is found that the batteries obtained in Examples 1 to 11 respectively have a large double layer capacity of electrodes and are superior in input and output performance under a large current.

When Examples 1 and 9 are compared with each other, the battery of Example 1 is superior in input and output performance to the battery of Example 9 and it can be therefore understood that the input and output performance is improved by allowing the surface roughness Ra(−) of the negative electrode to be larger than the median diameter.

When Examples 1 and 4 are compared with each other, the battery of Example 4 is superior in input and output performance to the battery of Example 1 and it can be therefore understood that the input and output performance is improved by allowing the surface roughness Ra(+) of the positive electrode to be larger than the mode diameter.

When Examples 1, 4 to 9 and 11 are compared with each other, the batteries of Examples 1 and 4 to 9 are superior to the battery of Example 11 in input and output performance and it can be therefore understood that the input and output performance can be improved when the ratio of the surface roughness Ra(−) of the negative electrode to the mode diameter is designed to be 2 or less.

Also, the batteries of Examples 1 to 9 and 11 comprising the positive electrode having a surface roughness Ra(+) of 0.1 to 0.6 μm and the negative electrode having a surface roughness Ra(−) of 0.1 to 0.6 μm are superior to Example 10 comprising the positive electrode having a surface roughness Ra(+) less than 0.1 μm and the negative electrode having a surface roughness Ra(−) less than 0.1 μm in the input and output performance. It is understood from these results that the surface roughness Ra(+) of the positive electrode and the surface roughness Ra(−) of the negative electrode are desirably designed to be 0.1 to 0.6 μm to improve the input and output performance.

Also, Comparative Example 1 in which the porosity is less than 50%, Comparative Example 2 in which the mode diameter is larger than the surface roughness Ra(−) of the negative electrode, Comparative Example 3 in which the porosity is less than 50% and the mode diameter is larger than the surface roughness Ra(−) of the negative electrode, and Comparative Examples 4 and 6 in which the mode diameter is the same as the median diameter are inferior in input and output performance under a large current to Examples 1 to 11.

Also, in the case of Comparative Example 5 using a carbonaceous material which is a negative electrode active material that absorbs lithium at a potential less than 0.4 V (vs. Li/Li$^+$), Comparative Example 5 is inferior in the input and output performance under a large current to Examples 1 to 11 though the separator in which the porosity is 50% or more, the median diameter is larger than the mode diameter and the surface roughness of the negative electrode is larger than the mode diameter is used. In Comparative Example 5, the carbonaceous material having an average particle diameter of 3 μm is used as the negative electrode active material and therefore, the negative electrode produced under a lower press pressure and having a low density was obtained. As a result, the surface roughness of the negative electrode was larger than 0.6 μm, which increased the distance from the surface of the negative electrode to the separator and therefore, the adhesion between the negative electrode and the separator and the diffusibility of the electrolytic solution deteriorated, resulting in low input and output performance. Moreover, when the input and output operations were repeated, lithium was precipitated on the separator, causing internal short circuits to be developed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A nonaqueous electrolyte battery comprising:
a positive electrode comprising a positive electrode current collector, and a positive electrode active material-containing layer provided on the positive electrode current collector and having a surface roughness Ra from 0.1 μm to 0.6 μm;
a negative electrode comprising a negative electrode active material having a Lithium ion insertion potential of 0.4 V (vs. Li/Li$^+$) or more;
a separator which is provided between the positive electrode and the negative electrode, and has a porosity of 50% or more and a pore diameter distribution in which a median diameter is larger than a mode diameter, wherein the porosity and the pore diameter distribution are measured by mercury porosimetry, and a surface roughness Ra of the negative electrode is larger than the mode diameter; and
a nonaqueous electrolyte.

2. The battery according to claim 1, wherein the surface roughness Ra of the negative electrode is larger than the median diameter.

3. The battery according to claim 1, wherein a ratio of the surface roughness Ra of the negative electrode to the mode diameter is 2 or less.

4. The battery according to claim 1, wherein the surface roughness Ra of the positive electrode is larger than the mode diameter.

5. The battery according to claim 1, wherein the mode diameter is from 0.05 μm to 0.4 μm.

6. The battery according to claim 1, wherein the median diameter is from 0.1 μm to 0.5 μm.

7. The battery according to claim 1, wherein the surface roughness Ra of the negative electrode is from 0.1 μm to 0.6 μm.

8. The battery according to claim 1, wherein the porosity of the separator is from 50% to 70%.

9. The battery according to claim 1, wherein the negative electrode active material comprises a lithium-titanium oxide.

10. The battery according to claim 9, wherein the lithium-titanium oxide has a spinel structure.

11. The battery according to claim 9, wherein an average particle diameter of the negative electrode active material is 1 μm or less.

12. The battery according to claim 1, wherein the negative electrode comprises a negative electrode current collector formed of aluminum having an average crystal grain size of 50 μm or less or an aluminum alloy having an average crystal grain size of 50 μm or less.

13. The battery according to claim 1, having a laminate structure in which the positive electrode and the negative electrode are alternately laminated by interposing the separator therebetween.

14. The battery according to claim 1, having a laminate structure in which the separator has a band form and is folded in a zigzag shape and the positive electrode and the negative electrode are alternately inserted into spaces between the folded parts of the separator.

15. The battery according to claim 1, further comprising a positive electrode terminal drawn from one end of the positive electrode and a negative electrode terminal drawn from one end of the negative electrode, wherein a direction in which the positive electrode terminal is drawn is opposite to a direction in which the negative electrode is drawn.

16. A battery pack comprising a nonaqueous electrolyte battery, wherein the nonaqueous electrolyte battery comprises:
a positive electrode comprising a positive electrode current collector, and a positive electrode active material-containing layer provided on the positive electrode current collector and having a surface roughness Ra from 0.1 μm to 0.6 μm;

a negative electrode comprising a negative electrode active material having a Lithium ion insertion potential of 0.4 V (vs. Li/Li$^+$) or more;

a separator which is provided between the positive electrode and the negative electrode, and has a porosity of 50% or more and a pore diameter distribution in which a median diameter is larger than a mode diameter, and the porosity and the pore diameter distribution are measured by mercury porosimetry, and a surface roughness Ra of the negative electrode is larger than the mode diameter; and a nonaqueous electrolyte.

17. The battery pack according to claim 16, wherein the surface roughness Ra of the negative electrode is larger than the median diameter.

18. The battery pack according to claim 16, wherein a ratio of the surface roughness Ra of the negative electrode to the mode diameter is 2 or less.

19. The battery pack according to claim 16, wherein the surface roughness Ra of the positive electrode is larger than the mode diameter.

20. A vehicle comprising the battery pack according to claim 16.

* * * * *